(12) United States Patent
Usman et al.

(10) Patent No.: US 11,724,601 B2
(45) Date of Patent: *Aug. 15, 2023

(54) AUGMENTED PERMANENT MAGNET SYSTEM

(71) Applicant: Hyperloop Technologies, Inc., Los Angeles, CA (US)

(72) Inventors: Irfan-ur-rab Usman, Los Angeles, CA (US); Tim Lambert, Los Angeles, CA (US)

(73) Assignee: Hyperloop Technologies, Inc., Los Angeles, CA (US)

( * ) Notice: Subject to any disclaimer, the term of this patent is extended or adjusted under 35 U.S.C. 154(b) by 339 days.

This patent is subject to a terminal disclaimer.

(21) Appl. No.: 17/168,861

(22) Filed: Feb. 5, 2021

(65) Prior Publication Data

US 2021/0178906 A1 Jun. 17, 2021

Related U.S. Application Data

(63) Continuation of application No. 16/039,691, filed on Jul. 19, 2018, now Pat. No. 10,940,764.

(Continued)

(51) Int. Cl.
*B60L 13/06* (2006.01)
*B60L 13/08* (2006.01)
*B61B 13/08* (2006.01)
*F16C 39/06* (2006.01)
*H01F 7/02* (2006.01)

(52) U.S. Cl.
CPC ............... *B60L 13/06* (2013.01); *B60L 13/08* (2013.01); *B61B 13/08* (2013.01); *F16C 39/063* (2013.01); *H01F 7/0242* (2013.01)

(58) Field of Classification Search
CPC .......... B60L 13/00; B60L 13/03; B60L 13/04; B60L 13/06; B60L 13/08; B60L 13/10
See application file for complete search history.

(56) References Cited

U.S. PATENT DOCUMENTS

| | | | |
|---|---|---|---|
| 3,841,227 A | 10/1974 | Fink | |
| 3,845,720 A | 11/1974 | Bohn | |

(Continued)

FOREIGN PATENT DOCUMENTS

| | | |
|---|---|---|
| CN | 2499268 | 7/2002 |
| CN | 101390283 | 3/2009 |

(Continued)

OTHER PUBLICATIONS

Europe Search Report/Office Action conducted in counterpart Europe Appln. No. 21 204 700.5 (dated Dec. 20, 2021).

(Continued)

*Primary Examiner* — Robert J McCarry, Jr.
(74) *Attorney, Agent, or Firm* — Seyfarth Shaw LLP

(57) ABSTRACT

A magnetic bearing system for controlling magnetic coupling between a mobile carriage and a guideway. The magnetic bearing system includes at least two engines successively arranged in a travel direction, wherein each of the at least two engines comprises at least two poles. The at least two engines have centerlines in the travel direction that are fixedly offset from each other, and the at least two engines are configured to be magnetically coupled to the guideway through air gaps.

18 Claims, 14 Drawing Sheets

Related U.S. Application Data

(60) Provisional application No. 62/537,689, filed on Jul. 27, 2017.

(56) References Cited

U.S. PATENT DOCUMENTS

| | | | |
|---|---|---|---|
| 3,847,086 | A | 11/1974 | Steenbeck |
| 3,851,594 | A | 12/1974 | Schwarzler et al. |
| 3,931,767 | A | 1/1976 | Karch |
| 3,939,776 | A | 2/1976 | Ross et al. |
| 3,964,398 | A | 6/1976 | Breitling |
| 5,291,834 | A | 3/1994 | Quaas |
| 5,479,145 | A | 12/1995 | Kalsi |
| 5,732,636 | A | 3/1998 | Wang |
| 8,774,430 | B2 | 7/2014 | Heed |
| 9,718,630 | B2 | 8/2017 | Bambrogan et al. |
| 10,940,764 | B2 * | 3/2021 | Usman ............... F16C 32/0472 |
| 10,974,909 | B2 | 4/2021 | Davidson et al. |
| 2003/0205163 | A1 | 11/2003 | Lamb et al. |
| 2003/0217668 | A1 | 11/2003 | Fiske et al. |
| 2006/0000383 | A1 | 1/2006 | Nast |
| 2006/0003635 | A1 | 1/2006 | Nast |
| 2006/0236890 | A1 | 10/2006 | Lamb et al. |
| 2007/0192000 | A1 | 8/2007 | Ellmann et al. |
| 2008/0083346 | A1 | 4/2008 | Fiske et al. |
| 2008/0148991 | A1 | 6/2008 | Wamble et al. |
| 2008/0236973 | A1 | 10/2008 | Hahn et al. |
| 2009/0114775 | A1 | 5/2009 | Wunder |
| 2010/0005997 | A1 | 1/2010 | Tozoni |
| 2010/0031846 | A1 | 2/2010 | Loser et al. |
| 2011/0271867 | A1 | 11/2011 | Liu |
| 2012/0019235 | A1 | 1/2012 | Post |
| 2013/0174757 | A1 | 7/2013 | Post |
| 2015/0360580 | A1 | 12/2015 | Oster |
| 2016/0033970 | A1 | 2/2016 | Henderson et al. |
| 2016/0229418 | A1 | 8/2016 | Bambrogan et al. |
| 2016/0257220 | A1 | 9/2016 | Irvin, Sr. et al. |
| 2016/0339798 | A1 | 11/2016 | Gunasekaran |
| 2017/0093307 | A1 | 3/2017 | Mizuno |
| 2017/0108038 | A1 | 4/2017 | Jastrzebski et al. |
| 2017/0275827 | A1 | 9/2017 | Handmer et al. |
| 2017/0291503 | A1 | 10/2017 | Wamble, III et al. |
| 2017/0353136 | A1 | 12/2017 | Brier et al. |
| 2017/0373580 | A1 | 12/2017 | Zhang et al. |
| 2018/0030662 | A1 | 2/2018 | Noe et al. |
| 2018/0047490 | A1 | 2/2018 | Handmer |
| 2018/0048248 | A1 | 2/2018 | McAlister |
| 2018/0056810 | A1 | 3/2018 | Lee et al. |
| 2018/0069464 | A1 | 3/2018 | Takedomi et al. |
| 2018/0073560 | A1 | 3/2018 | Karpetis et al. |
| 2018/0083522 | A1 | 3/2018 | Huard |
| 2018/0093587 | A1 | 4/2018 | Melvin et al. |
| 2018/0111505 | A1 | 4/2018 | Caron et al. |
| 2018/0118227 | A1 | 5/2018 | Claas et al. |
| 2018/0141459 | A1 | 5/2018 | Henderson |
| 2018/0180095 | A1 | 6/2018 | Jastrzebski et al. |
| 2018/0186389 | A1 | 7/2018 | Hosseini |
| 2018/0194246 | A1 | 7/2018 | Amoskov et al. |
| 2018/0194339 | A1 | 7/2018 | Goelet |
| 2018/0216665 | A1 | 8/2018 | Kozaki |
| 2018/0223481 | A1 | 8/2018 | Dunham |
| 2018/0237996 | A1 | 8/2018 | Sadeghi |
| 2018/0248460 | A1 | 8/2018 | Borghi et al. |
| 2018/0248498 | A1 | 8/2018 | Piitulainen et al. |
| 2018/0251343 | A1 | 9/2018 | Hakala et al. |
| 2019/0023285 | A1 | 1/2019 | Usman |
| 2020/0164750 | A1 | 5/2020 | Kooger et al. |
| 2020/0376965 | A1 | 12/2020 | Wamble, III et al. |
| 2021/0016814 | A1 | 1/2021 | Geuze et al. |

FOREIGN PATENT DOCUMENTS

| | | |
|---|---|---|
| DE | 19923161 | 12/1999 |
| EP | 0 216 452 | 4/1987 |
| WO | 2016/040374 | 3/2016 |
| WO | 2016/197031 | 12/2016 |
| WO | WO2020/060410 | 3/2020 |
| WO | WO2020/122718 | 6/2020 |

OTHER PUBLICATIONS

China Search Report/Office Action conducted in counterpart China Appln. No. 201880049548.1 (dated Mar. 3, 2021).

Europe Search Report conducted in counterpart Europe Appln. No. 18837860.8 (dated Mar. 24, 2021).

Saudi Arabia Office Action conducted in counterpart Saudi Arabia Appln. No. 520411158 (dated May 16, 2022) (w/ translation).

Ho, "Is this Chinese protype the shape of maglev train tech to come?" South China Morning Post.

Cassat et al., "Maglev projects technology aspect and choices," IEEE Transactions on Applied Superconductivity (Apr. 2002); https://www.researchgate.net/publication/224055510.

Cassat et al., "Maglev—Worldwide Status and Technical Review," Electrotechnique du Futur (Dec. 14&15, 2011); https://www.researchgate.net/publication/236993225.

Jian, "Floating in the struggle-the youth power of China's independent maglev train," Xinhua News Agency (May 3, 2020); www.xinhuanet.com/politics/2020-05/03/c_1125939110.htm.

Second China Search Report/Office Action conducted in counterpart China Appln. No. 201880049548.1 (dated Nov. 18, 2021) (w/translation).

* cited by examiner

AUGMENTED PERMANENT MAGNET SYSTEM

CROSS-REFERENCE TO RELATED APPLICATION

This application is a continuation of U.S. patent application Ser. No. 16/039,691 filed Jul. 19, 2018 and claims the benefit of U.S. Provisional Application No. 62/537,689 filed Jul. 27, 2017, the disclosures of which are expressly incorporated by reference herein in their entireties.

BACKGROUND

1. Field of the Disclosure

The present disclosure relates to a magnet system, namely a system that produces a tunable magnetomotive force.

2. Background of the Disclosure

Friction represents an inordinate source of drag for a high-speed, high-efficiency transportation system. A large source of friction is the bearing, i.e., the component that allows the vehicle to travel by interfacing between the vehicle and the surface supporting it. Conventional forms of travel generally utilize wheels as bearings. Wheels, however, face a large degree of friction and degradation at high speeds.

Thus, there is a need for an improved bearings for a high-speed, high-efficiency transportation system.

BRIEF SUMMARY

The novel features which are characteristic of the disclosure, both as to structure and method of operation thereof, together with further aims and advantages thereof, will be understood from the following description, considered in connection with the accompanying drawings, in which the preferred embodiment of the disclosure is illustrated by way of example. It is to be expressly understood, however, that the drawings are for the purpose of illustration and description only, and they are not intended as a definition of the limits of the disclosure.

Aspects of the present disclosure are directed to a novel system for providing a tunable magnetic field. This tunable magnetic field can be utilized, e.g., in the field of magnetic levitation transportation systems ("maglev"). Some maglev systems use electrodynamic suspension (EDS) and Electromagnetic Suspension (EMS), which uses attractive forces and/or bidirectional between magnetic fields to control and maintain separation between a vehicle, train, pod, etc., over a guideway or between a vehicle, train, pod, etc., from an overhead guideway. These systems generally rely on a magnetic field created by inductance, as demonstrated by a combination of Ampere's Law and Gauss' Law, which generate a force demonstrated by the Lorentz Law.

In an exemplary embodiment, a magnet or magnet assembly, also referred to herein as an augmented permanent magnet system or an "engine" can be substantially fixed to the top of a vehicle, train, pod, etc., or can be substantially fixed to a bottom of the vehicle, train, pod, etc. so that the vehicle, train, pod, etc., can be guided along, in a non-contacting manner, an overhead suspended guideway or a ground based guideway. The magnet assembly or engine of the vehicle, train, pod, etc. can be magnetically coupled to, albeit in a non-contacting manner, the guideway, which can be made from, e.g., a ferromagnetic material such as iron or steel. The magnet assembly or engine can include at least one electromagnet, which allows for an adjustment of the magnetic field between the magnet assembly or engine and the guideway to compensate for variations in displacement distances as the vehicle, train, pod, etc. moves along the guideway. By way of example, when the vehicle, train, pod, etc. is suspended from an overhead guideway, the magnetic field between the magnet assembly or engine may be adjusted such that the attractive forces between the magnet assembly or engine and the guideway are generally balanced with the force of gravity on the vehicle, train, pod, etc. A similar arrangement can be utilized in embodiments in which the vehicle, train, pod, etc., is guided over the guideway. That is, the magnet assembly or engine can be arranged to magnetically couple to a bottom surface of the guideway. In this way, the magnetic field between the magnet assembly (or engine) may be adjusted such that the attractive forces between the magnet assembly or engine and the guideway are again generally balanced with the force of gravity on the vehicle, train, pod, etc. Thus, in embodiments, whether suspended from or guided over the guideway, the vehicle, train, pod, etc. may levitate while in motion. This system is more efficient than conventional EDS systems because the losses are lower due to the novel geometry that allows the return flux paths to be orthogonal to the direction of travel.

Embodiments are directed to a magnetic bearing system for controlling magnetic coupling between a mobile carriage and a guideway. The magnetic bearing system includes at least one engine, which comprises at least two poles, at least one permanent magnet and at least one coil. The engine is configured to be magnetically coupled to the guideway through at least one air gap.

According to embodiments, at least one coil may include at least two coils arranged so that at least one of the at least two coils surrounds each of the at least two poles.

In accordance with embodiments, the at least one air gap can include a plurality of air gaps located between a free end of the at least two poles and the guideway. Further, a lateral portion can be arranged to join the at least two ends together at ends opposite the free ends, and the permanent magnet can be arranged in the lateral portion.

According to other embodiments, the permanent magnet may be arranged to generate a magnetic flux through the engine, the guideway and the air gaps. The magnetic flux generated by the permanent magnet can be sufficient to maintain a predetermined spacing for the at least one air gap while holding the vehicle against a force of gravity. The guideway may be arranged below the vehicle or the guideway can be arranged above the vehicle, which is suspended from the guideway.

In other embodiments, the at least one engine may include a plurality of engines successively arranged in a direction of travel, the plurality of engines can be arranged parallel to each other in the direction of travel and each of the plurality of engines may include at least two poles, at least one permanent magnet and at least one coil. The at least two poles of each of the plurality of engines can be aligned perpendicular the direction of travel. The at least two poles of a first engine can be aligned in the direction of travel with the at least two poles of a second engine adjacent the first engine. The at least two poles of a first engine may be laterally offset perpendicular to the at least two poles of a second engine adjacent the first engine. The at least two poles of a first engine can have a length in the direction of travel that is a same as a length in the travel direction of the at least two poles of a second engine. The at least two poles of a first engine may have a length in the direction of travel that is different from a length in the travel direction of the at least two poles of a second engine. The at least two poles of a first engine may have a length in the direction of travel that is a multiple of a length in the travel direction of the at least two poles of a second engine.

According to other embodiments, the at least two poles may be configured to shape a flux in the guideway.

In accordance with still other embodiments, the at least two poles can be formed from one of a U-shaped or an E-shaped core.

According to other embodiments, the at least two poles may include a ferrous material and the permanent magnet comprises a rare earth metal.

Embodiments are directed to a magnetic bearing system for controlling magnetic coupling between a mobile carriage and a guideway. The magnetic bearing system includes at least two engines successively arranged in a travel direction, wherein each of the at least two engines comprises at least two poles. The at least two engines have centerlines in the travel direction that are fixedly offset from each other, and the at least two engines are configured to be magnetically coupled to the guideway through air gaps.

According to embodiments, each of the at least two engines can further include at least one permanent magnet and at least one coil. The at least one coil may include at least two coils arranged so that in each of the at least two engines at least one of the at least two coils surrounds each of the at least two poles.

In accordance with embodiments, the at least two poles of each of the at least two engines can have free ends facing the guideway. Further, the air gaps may be located between the free ends of the at least two poles of each of the at least two engines and the guideway. Each of the at least two engines may further include a lateral portion joining the at least two poles together at ends opposite the free ends, and at least one permanent magnet is arranged in the lateral portion. The lateral portion of each of the at least two engines can be is oriented perpendicularly to the travel direction.

In other embodiments, each of the at least two engines may further include at least one permanent magnet to generate a magnetic flux through the guideway and the at least one air gap. The magnetic flux generated by the at least one permanent magnet of each of the at least two engines can be sufficient to maintain a predetermined spacing for the air gaps while holding the vehicle against a force of gravity.

According to other embodiments, each of the at least two poles of the at least two engines may be laterally offset from each other in a direction perpendicular to the travel direction. The at least two engines can include at least a first engine and a second engine, and the at least two poles of the first engine may have a same length in the travel direction as the at least two poles of the second engine. Alternatively, the at least two engines can further include at least a first engine and a second engine, and the at least two poles of the first engine may have a different length in the travel direction than the at least two poles of the second engine. Further, the at least two poles of the first engine may have a length in the travel direction that is a multiple of a length of the at least two poles of the second engine in the travel direction.

According to further embodiments, the at least two engines can include at least three engines that include at least a first engine, a second engine and a third engine successively arranged in the travel direction, the second engine being located between the first engine and the third engine. The centerlines of the first engine and the third engine may be aligned in the travel direction and the centerline of the second engine can be fixedly offset from the centerlines of the first engine and the third engine in a direction perpendicular to the travel direction. Further, lengths of the at least two poles of the first engine and lengths of the at least two poles of the third engine can be the same, and lengths of the at least two poles of the second engine may be different from the lengths of the at least two poles of each of the first engine and the third engine. The lengths of the at least two poles of the second engine may be equal to combined lengths of the at least two poles of the first engine and of the third engine.

In accordance with still yet other embodiments, the at least two engines can include at least four engines that include at least a first engine, a second engine, a third engine and a fourth engine successively arranged in the travel direction, the second and third engines being located between the first engine and the fourth engine. The centerlines of the first engine and the fourth engine can be aligned in the travel direction and the centerlines of the second engine and the third engine can be aligned in the travel direction, and the centerlines of the first engine and the fourth engine may be fixedly offset from the centerlines of the second engine and the third engine in a direction perpendicular to the travel direction. Lengths of the at least two poles of the first engine, second engine, third engine and fourth engine may be a same length.

BRIEF DESCRIPTION OF THE DRAWINGS

These and other features of this disclosure will be best understood by reference to the following detailed description of a preferred embodiment of the disclosure, taken in conjunction with the accompanying drawings, in which.

DETAILED DESCRIPTION OF EMBODIMENTS OF THE DISCLOSURE

Figure 1:
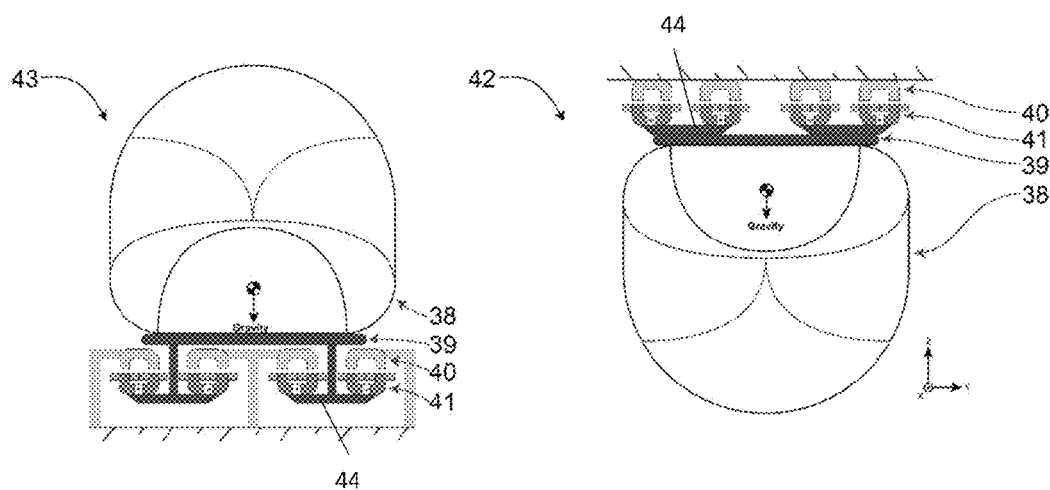
FIG. 1 shows an embodiment of a vehicle configured to travel over a guideway and an embodiment of a vehicle configured to travel suspended from a guideway.

The following detailed description illustrates by way of example, not by way of limitation, the principles of the disclosure. This description will clearly enable one skilled in the art to make and use the disclosure, and describes several embodiments, adaptations, variations, alternatives and uses of the disclosure, including what is presently believed to be the best mode of carrying out the disclosure. It should be understood that the drawings are diagrammatic and schematic representations of exemplary embodiments of the disclosure, and are not limiting of the present disclosure nor are they necessarily drawn to scale.

Embodiments of the present disclosure may be used in a transportation system, for example, as described in commonly-assigned application Ser. No. 15/007,783, titled "Transportation System," the contents of which are hereby expressly incorporated by reference herein in their entirety.

Further, embodiments of the present disclosure may be used with various guideway or track topologies or structures, for example, as described in commonly-assigned application Ser. No. 16/039,736 filed Jul. 19, 2018, titled "Vehicle Based Guided Switching," the contents of which are hereby expressly incorporated by reference herein in their entirety.

In the following description, the various embodiments of the present disclosure will be described with respect to the enclosed drawings. As required, detailed embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, reference to "a magnetic material" would also mean that mixtures of one or more magnetic materials can be present unless specifically excluded. As used herein, the indefinite article "a" indicates one as well as more than one and does not necessarily limit its referent noun to the singular.

Except where otherwise indicated, all numbers expressing quantities used in the specification and claims are to be understood as being modified in all examples by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of ±5% of the indicated value.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B".

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for example a composition comprising a compound A may include other compounds besides A. However, the term "comprising" also covers the more restrictive meanings of "consisting essentially of" and "consisting of", so that for example "a composition comprising a compound A" may also (essentially) consist of the compound A.

The various embodiments disclosed herein can be used separately and in various combinations unless specifically stated to the contrary.

The present disclosure relates to an augmented permanent magnet system (APMS) or engine. FIG. 1 shows two embodiments of a vehicle, train, pod, etc. [hereinafter "vehicle"] 38 that can be guided along a guideway 40, which is fixed. In the left-hand embodiment 43, vehicle 38 is arranged to be guided over guideway 40, while in the right-hand embodiment 42, vehicle 38 is suspended from guideway 40. In relation to embodiment 43, embodiment 42 has advantages in terms of structural efficiency of the mechanical structure. Bogies 44 are coupled to vehicle 38 via a mechanical structure, such as a coupling plate 39. At the ends of the bogies 44 a set of magnet assemblies or engines 41 to be magnetically coupled to guideway 40. In the illustrated embodiments, the sets of engines 41 interact with guideway 40. While not viewable in FIG. 1, multiple engines 41 may be arranged parallel to each other in the direction of vehicle travel, i.e., in the x-axis direction. These multiple engines 41 can also be aligned with one another in the travel direction, or one or more engines may be offset from each other in the Y-direction. Engines 41 are tunable to maintain a non-contacting coupling with guideway 40 so that vehicle 38 levitates as it is guided along guideway 40. Moreover, from the two exemplary embodiments, it can be seen that the magnetic coupling between engines 41 and guideway 40 can be tuned to overcome or compensate for the weight of vehicle 38.

Figure 2:
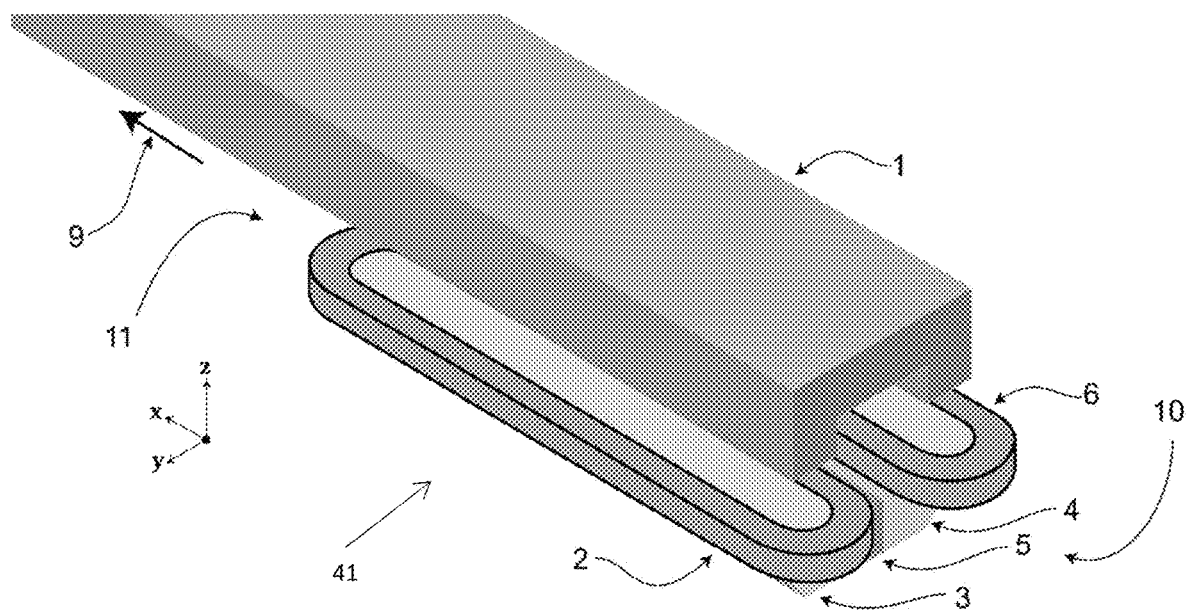
FIG. 2 shows an angled view of an exemplary augmented permanent magnet system in accordance with aspects of the disclosure.

FIG. 2 shows a more detailed plan view of at least one engine 41 and at least a portion of guideway 1, which is fixed to some ground (inertial ground or structure). Guideway 1 can include a ferrous/steel material and may be embodied in a number of configurations, see, e.g., FIG. 9, and in this exemplary embodiment includes two poles. Engine 41 can include, e.g., metal poles 3, 4 made with, e.g., known ferromagnetic materials such as iron or steel, at least one permanent magnet 5, which can include a rare earth magnet material, such as neodymium-iron-boron, and at least one coil 2, 6 for carrying electric current. In the exemplary embodiment, coils 2, 6 surround metal poles 3, 4, respectively, to form electromagnets at each pole. Moreover, engine 41 in FIG. 2 is movable relative to guideway 1 generally in a direction of travel 9, which is parallel to the x-direction. Based on this orientation and direction of travel, a leading edge or nose 11 and a trailing end or tail 10 can be defined for engine 41.

In the illustrated embodiment, metal poles 3, 4 and the at least one permanent magnet 5 can be arranged in a number of ways to form a substantially horseshoe or U-shaped core, e.g., where metal poles 3, 4 form first and second arms of the U-shaped core and a lateral portion of the U-shaped core connecting the two arms can include the permanent magnet 5. Alternatively, metal poles 3, 4 can include some portion of magnet material, e.g., rare earth magnet material, such as neodymium-iron-boron, to form permanent magnet 5. This U-shaped core embodiment of engine 41 is more particularly shown, e.g., in FIG. 3, which shows a cross-section of FIG. 2 viewed in the X-axis direction.

Figure 3:
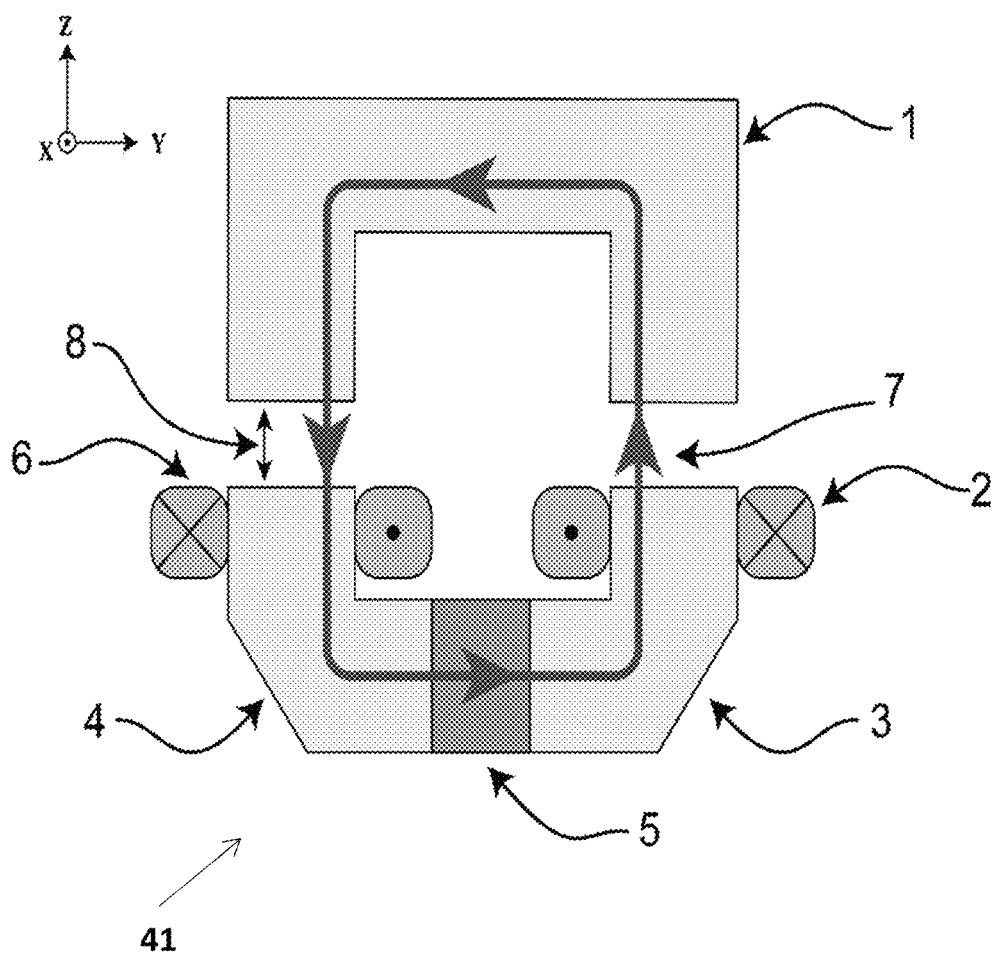
FIG. 3 shows a cross-sectional view of an exemplary engine viewed in a direction of travel in accordance with aspects of the disclosure.

In the exemplary embodiment of FIG. 3, guideway 1 is stationary or fixed to inertial ground or a structure. Engine 41, which includes coils 2, 6 forming electromagnets at the ends of metal poles 3, 4 and permanent magnet 5, is offset from guideway 1 by an air gap 8 which as depicted in the Z-direction. However, it is understood that air gap 8 can have significant extent in both Z- and Y-directions. According to this embodiment, when zero current is applied to coils 2, 6, permanent magnet 5 is the only source of magnetic potential in engine 41. Moreover, if permanent magnet 5 is magnetized as shown (North facing in the direction of the arrow, i.e., in the positive Y-direction), a magnetic flux 7 is generated through air gap 8, engine 41 and guideway 1 (in a counter-clockwise direction), as shown, in a magnetic flux closure path that is substantially orthogonal to the direction of travel. This generates a force (closing gap force) between engine 41 and guideway 1, which can act to close air gap 8. To maintain this air gap 8, this gap closing force is preferably balanced by an opposing force, such as by gravity. Further, when engine 41 is attached to vehicle 38 (see FIG. 1), the closing gap force is preferably be balanced by an opposing force that includes the mass of the vehicle 38.

The net force is preferably be maintained through a stabilization method as this configuration is open loop unstable. This stabilization method can be either passive (such as a mechanical compliance or through some eddy current generation method) or active (as described below).

According to arrangement of the engine 41 and guideway 1, the flux return path is orthogonal to the direction of travel of engine 41 (where direction of travel is largely orthogonal to the YZ plane). In this way, a full flux reversal (fully positive to fully negative) can be avoided in the direction of travel as seen by an engine moving along guideway 1. As described below, this implies that drag may be minimized through the minimization of eddy currents generated in the guideway due to changes in flux over time.

It is to be further understood that engine 41 can be formed with only metal poles and at least one coil, i.e., as an electromagnet, whereby the engine flux direction is arbitrary since it depends upon the direction of current flowing through the coil(s). However, as this arrangement does not have a natural magnetic field, it cannot be operated in a zero current or rest state, and therefore, must always be energized in order to overcome the mass of the vehicle in the direction of gravity.

Figure 4:
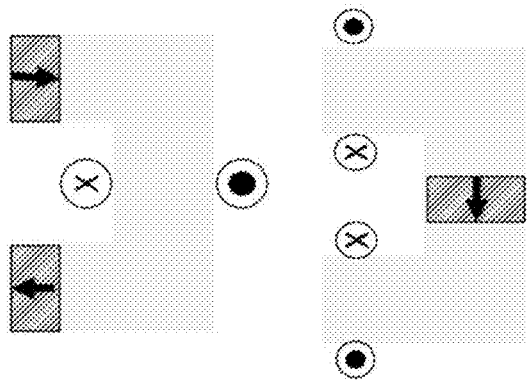
FIG. 4 shows various embodiment for configuring a U-shaped engine.
Figure 4:
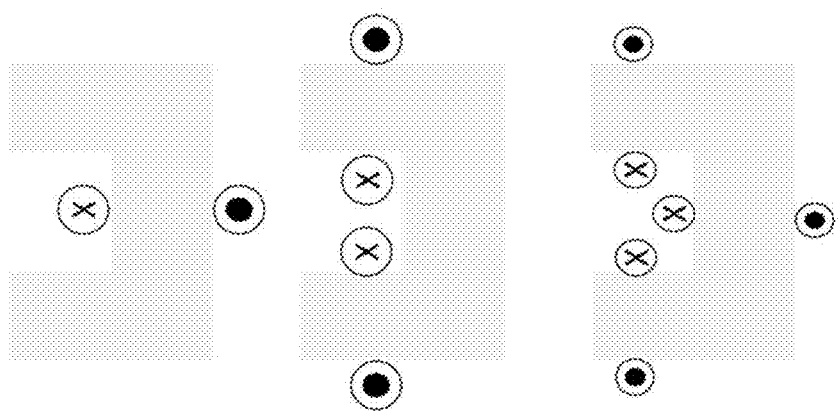
Figure 4:
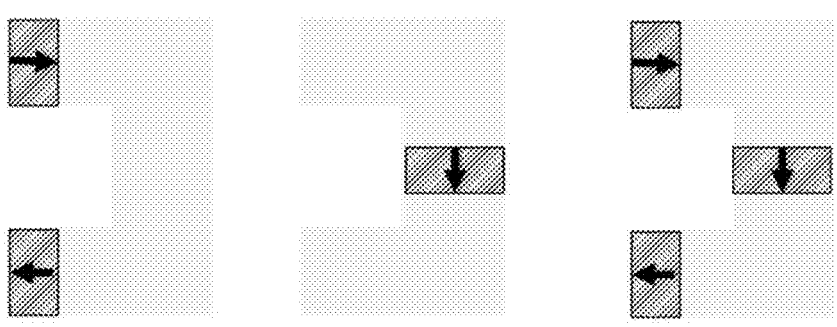
Figure 5:
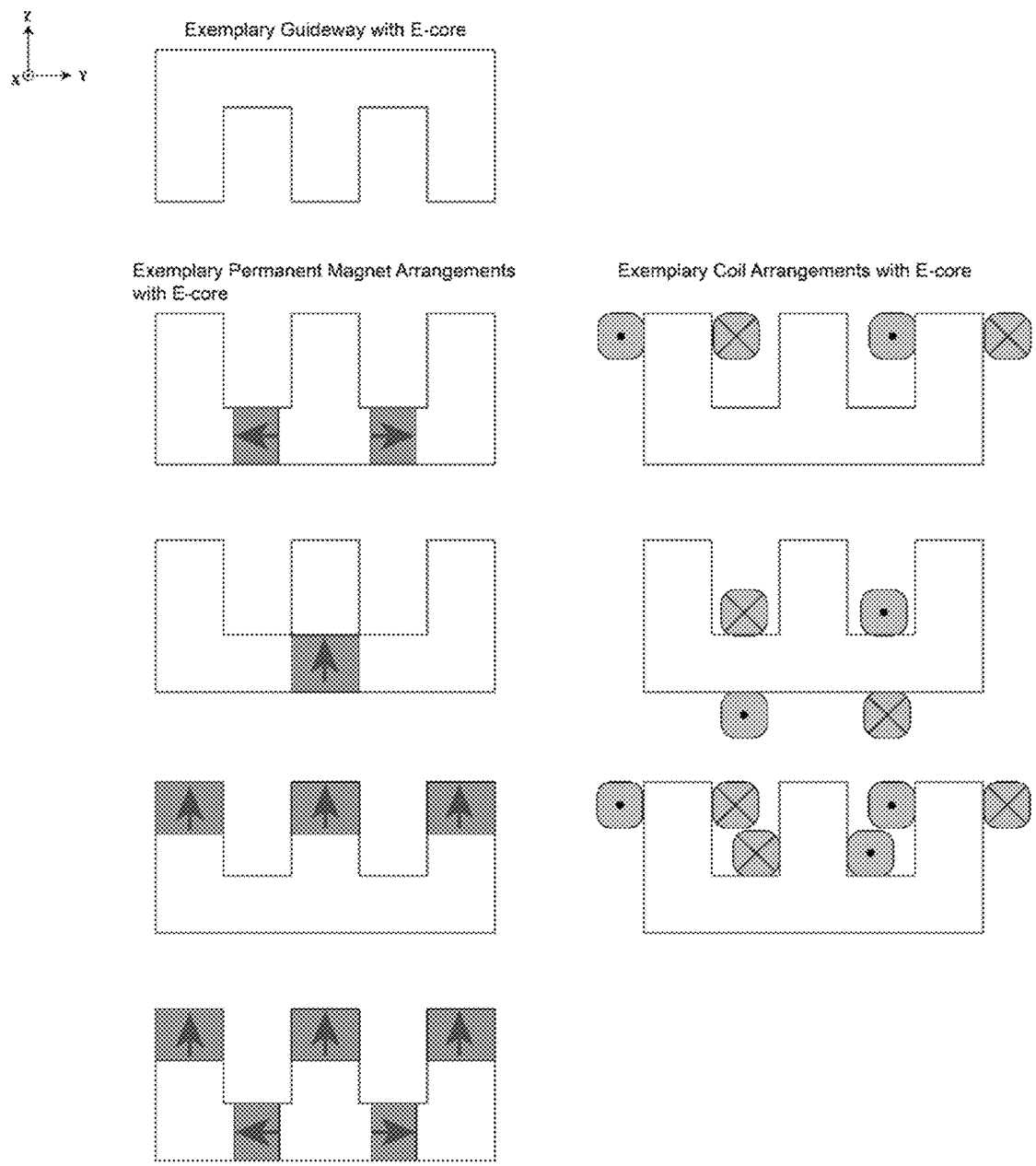
FIG. 5 shows various embodiment for configuring an E-shaped engine.

Thus, other arrangements of the metal poles, permanent magnet and coils forming engine 41 are contemplated without departing from the spirit and scope of the embodiments. FIG. 4 shows a number of different arrangements of a U-shaped engines showing exemplary and non-limiting embodiments of various poles, permanent magnet and coil arrangements, in which the coil may be series wound or parallel wound and/or driven by separate drivers in accordance with aspects of the disclosure. Moreover, it is to be understood that any combination of the permanent magnets and coil configurations are compatible with each other. In other embodiments, it can be advantageous to use an E-shaped engine. FIG. 5 show various embodiments of E-shaped exemplary and non-limiting embodiments of various poles, permanent magnet and coil arrangements, in which the coil may be series wound or parallel wound and/or driven by separate drivers in accordance with aspects of the disclosure. Again, it is to be understood that any combination of the permanent magnets and coil configurations are compatible with each other.

The engine may include at least one coil that is configured to provide flux in a designed direction. In embodiments, this may be substantially the same direction as the natural flux path of the engine or of the permanent magnet(s) of the engine. This can be achieved through any one of several geometries of the electromagnet and metal poles, such as an exemplary embodiment where a wire is substantially wrapped around the lateral portion of the permanent magnet module forming a coil, such that the plane formed by the coil is substantially orthogonal to the plane formed by the outer faces of the first and second poles. The coil may also wrap around multiple aligned engines. The engines can be operated in two modes, i.e., a cancellation mode and a reinforcement mode. In cancellation mode, a current is supplied to the coil to create a magnetic field in a direction opposite the natural magnetic field of the engine. Thus, the current flowing within the coil can create a magnetic field directed opposite the magnetic field of the engine, whereby the attraction between the engines and the guideway is reduced. In reinforcement mode, a current can be supplied to the coil in a direction to create a magnetic field in a same direction as the natural magnetic field of the engine. Thus, the current flowing within the coil can create a magnetic field directed in a same direction as the magnetic field of the engine, whereby the attraction between the engines and the guideway is increased.

Figure 6:
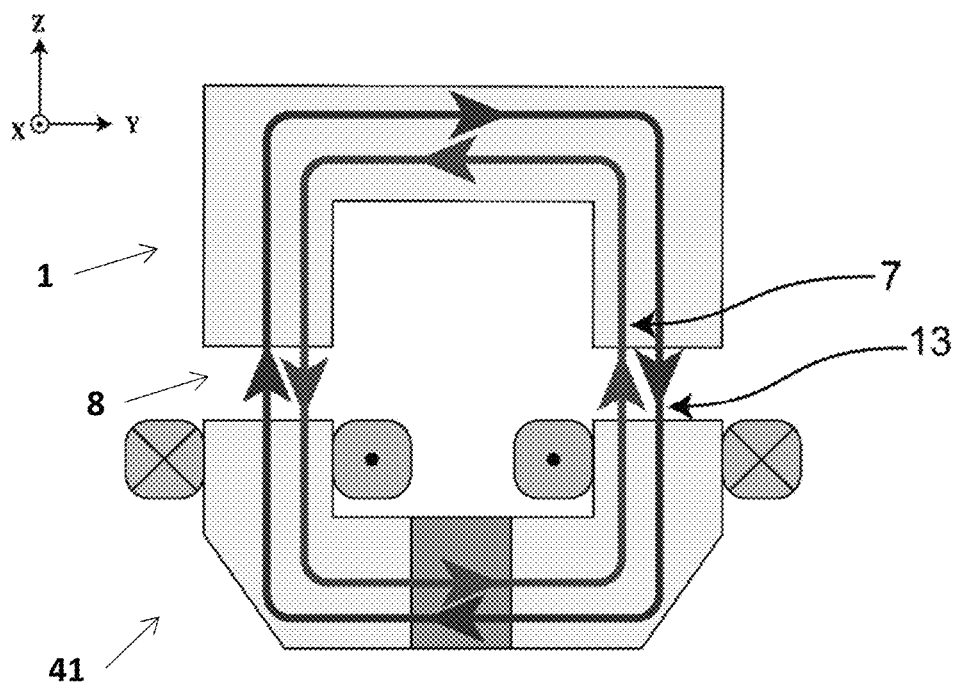
FIG. 6 shows a cross-sectional view of an exemplary engine viewed in a direction of travel in accordance with aspects of the disclosure in a cancellation mode.

Referring back to FIG. 3, which shows the zero current/rest state of the engine 41 and guideway 1, when the vehicle moves along the guideway 1, the air gap 8 between the engine 41 and guideway 1 can vary. In certain instances, as the vehicle moves along the guideway 1, the air gap 8 may tend to decrease. To address this situation, the system can employ the cancellation mode. FIG. 6 shows an embodiment in which the air gap 8 between the engine 41 and the guideway 1 has decreased below the zero current state established by the natural magnetic flux 7 of the engine 41, as in FIG. 3. In order to return the system to its rest state, i.e., to restore the zero current air gap 8, a negative current can be supplied to the coils at the poles to generate a magneto-magnetic force (MMF) from the electromagnets and to generate a magnetic flux 13 through engine 41, air gap 8 and guideway 1 in a direction opposite magnetic field 7, e.g., where, as in FIG. 6, magnetic field 7 is in a counter-clockwise direction and the magnetic flux 13 is in a clockwise direction, thereby diminishing the attractive force between the engine 41 and the guideway 1 and increasing the air gap 8. Thus, this magnetic flux 13 from the electromagnets is super-imposed on magnetic flux 7 generated by the permanent magnet, so the electromagnet flux 13 acts to cancel the permanent magnet flux 7, thereby decreasing the total flux in air gap 8 and thus decreasing the gap-closing force generated between the guideway 1 and the engine 41.

Figure 7:
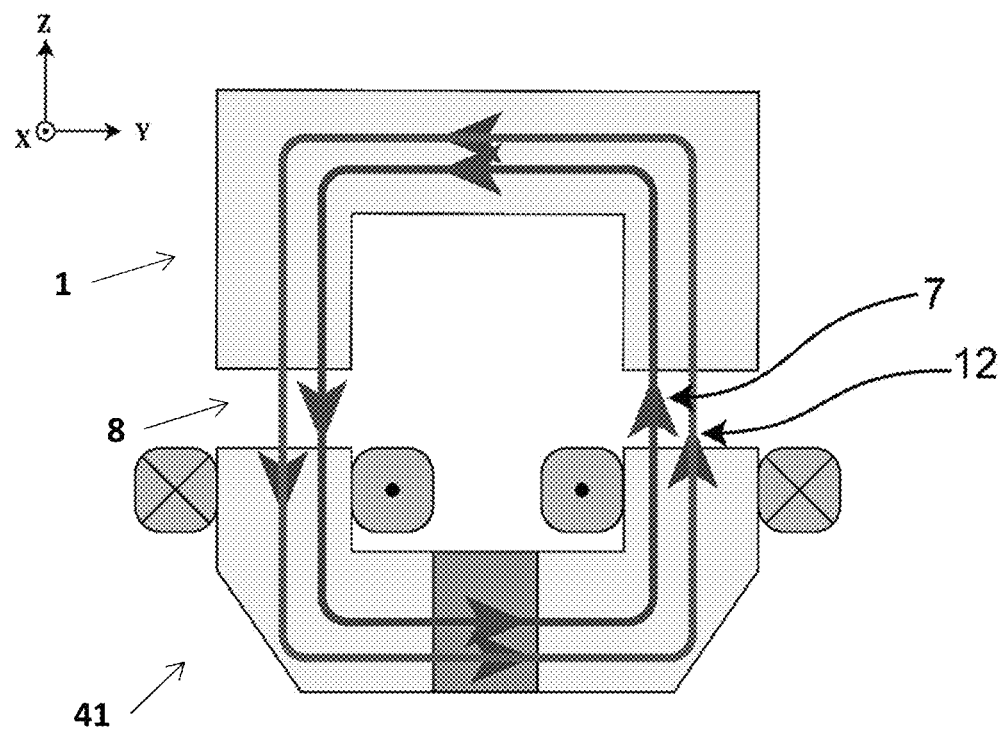
FIG. 7 shows a cross-sectional view of an exemplary engine viewed in a direction of travel in accordance with aspects of the disclosure in a reinforcement mode.

In contrast to the above, in certain instances, as the vehicle moves along the guideway, the air gap may tend to increase. To address this situation, the system can employ the reinforcement mode. FIG. 7 shows an embodiment in which the air gap 8 between the engine 41 and the guideway 1 has increased beyond the zero current state established by the natural magnetic flux 7 of the engine, as in FIG. 3. In order to return the system to its rest state, i.e., to restore the zero current air gap 8, a positive current can be supplied to the coils at the poles to generate a magnetomotive force (MMF) from the electromagnets and to generate a magnetic flux 12 through engine 41, air gap 8 and guideway 1 in a same direction as magnetic field 7, e.g., where, as in FIG. 7, magnetic field 7 is in a counter-clockwise direction and the magnetic flux 13 is also in the counter-clockwise direction, thereby increasing the attractive force between the engine 41 and the guideway 1 and decreasing the air gap 8. This magnetic flux 13 is super-imposed on the magnetic flux 7 generated by the permanent magnet, so the electromagnet flux 12 acts to reinforce the permanent magnet flux 7, thereby increasing the total flux in the air gap 8 and thus increasing the gap-closing force generated between the guideway 1 and the engine 1.

In embodiments, an active control system can maintain a predefined or preferred distance between the engine and the guideway. In this regard, a combination of applying reinforcing and cancelling MMFs from the electromagnets allows an active stabilization system to be implemented using a controller that commands current through the electromagnets. This also enables a completely non-contact bearing method using the engine and a control system. The control system may monitor the distance between the engine and the guideway, also known as the ride height. Moreover, a plurality of sensors configured to detect, e.g., displacement, velocity, and/or acceleration of the vehicle can be coupled to transmit this detected information to the control system so that the ride height can be determined. If the active control system finds that the ride height distance has increased beyond a preselected tolerance, then the active control system may adjust the direction and strength of the current through the coil to increase the attractive force between the engine and guideway, returning the ride height to within the preselected tolerance, see FIG. 7. Likewise, if the active control system finds that the distance between the engine and the guideway has decreased below a preselected tolerance, then the active control system may adjust the direction and strength of the current through the coil to decrease the attractive force, between the engine and guideway, returning the ride height to within the preselected tolerance, see FIG. 6. The active control system may also include a controller configured to adjust the strength and flow of current through the coil in response to signals from the control system.

A parameter of concern in a non-contact bearing system is the drag force generated during motion along the guideway. For magnetic bearings, the relevant drag generation mechanism is described by viewing an element of the guideway over time. This element will see a change in magnetic flux over time due to the interaction with the engine, which will generate an electrical potential field which will in turn generate a current density distribution or eddy current distribution, in accordance with Maxwell's laws. This eddy current distribution will subsequently produce a reactive magnetic field which will act to reduce the original magnetic flux. This reduction in field acts to produce a reduction in the net gap-closing force as well as a drag force which opposes the direction of motion.

Figure 8:
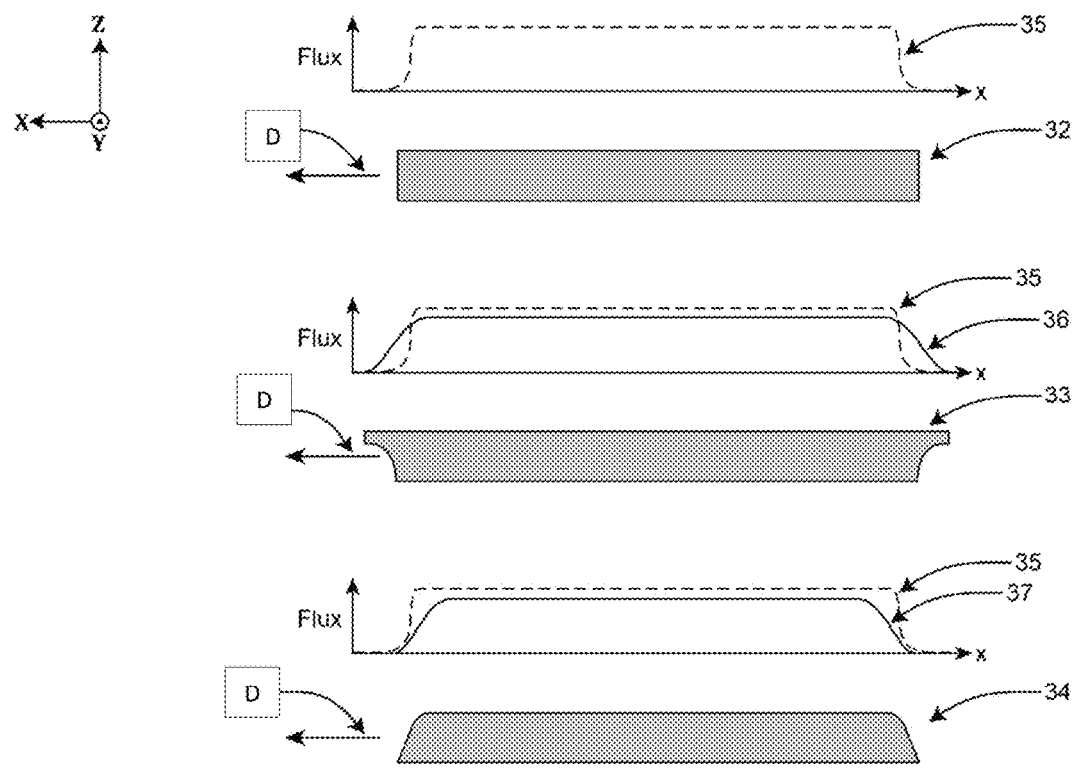
FIG. 8 shows various embodiments for configuring the engine to shape the flux.

In the case of the engine according to the embodiments (as compared to other electromagnetic suspension systems such as the German TRANSRAPID), and similarly to the Japanese LINIMO, the flux return path, as illustrated in FIG. 8, is orthogonal to a direction of motion D. Those skilled in the art will be able to determine that the magnetic flux change over time is directly related to the velocity and the gradient of the spatial distribution of magnetic flux over the engine in the direction of travel. FIG. 8 shows the distribution 35 of flux over the engine in the X-direction, which is parallel to the direction of travel D, for an engine with no flux shaping elements in the geometry of the poles or the permanent magnet represented by a body 32. As seen in distribution 35, the spatial gradient of the flux is high at the leading and trailing edge of the engine and zero elsewhere, showing that the drag-inducing eddy currents are associated only with the leading and trailing edges of the engine. This is in contrast to the lift or gap-closing force which is associated with the entire length of the engine/flux distribution as it depends on the square of the flux rather than its gradient. This shows the fundamental advantage of this configuration, as the lift-to-drag (the critical performance metric for a high performance magnetic bearing system) can be maximized by lengthening the engine in the direction of travel, such that gap closing force increases (i.e., lift increases) while drag remains largely fixed for a constant speed. It is noted that the total change in flux seen does not exceed zero to some maximum amount of flux, in contrast to a system such as TRAN- SRAPID, which has the flux return path in the direction of travel, such that the guideway sees a change from fully positive flux to fully negative. As the eddy currents generated depend on the square of the amplitude of the gradient of the magnetic flux, this doubling represents a notional 4X on the drag.

To reduce this drag further, flux shaping strategies may be implemented to reduce the spatial gradient of the flux at the leading and trailing edges. FIG. 8 shows an embodiment in which either the permanent magnets or metal poles may be shaped, as illustrated by body 33, with thinner elements near the leading and trailing edges in order to gradually increase the magnetic field strength in the direction of travel D. A representative field for such a design is shown in distribution 36, which when compared to the unshaped field of distribution 35, exhibits reduced spatial gradient of magnetic flux in the direction of travel D. Similarly, the height or volume of either or both permanent magnets and steel poles may be reduced near the leading and trailing edges as shown by the example of body 34, producing a representative magnetic flux distribution 37, which also has reduced spatial gradient of magnetic flux in the direction of travel.

Any of these flux shaping methods can reduce the total drag on the engine due to eddy current distributions in the guideway.

Figure 9:
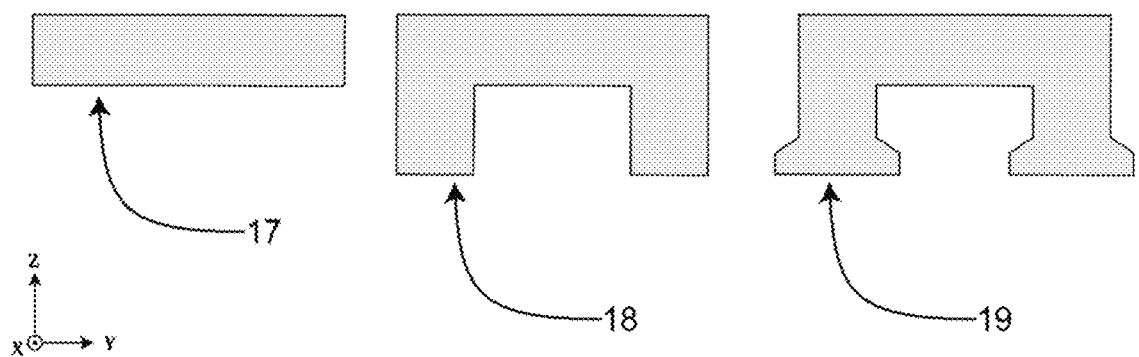
FIG. 9 shows various embodiments for configuring the guideway to shape the flux.

FIG. 9 shows various embodiments for geometries of possible guideway cross-sections, such as a flat plate 17, a U-shaped core with poles 18, and a U-shaped core with poles and shaped flanges 19. The geometries, which are not intended to be limited to these illustrated embodiments, may include other embodiments for facilitating the magnetic coupling to the engine. Further, the specific design for a particular system can depend on the performance requirements relative to the cost function for the particular system. Thus, as set forth above, embodiments of the present disclosure may be used with the various guideway or track topologies or structures described, e.g., in commonly-assigned application Ser. No. 16/039,736 filed Jul. 19, 2018, titled "Vehicle Based Guided Switching," the contents of which are hereby expressly incorporated by reference herein in their entirety.

It is further understood that the guideway, which can be laminated or solid core material, preferably includes a ferrous material, such as steel, construction steel, electrical steel, iron, etc. It is further to be understood that laminations offer a further advantage of limiting the eddy currents generated by the changing flux distribution over time.

Figure 10:
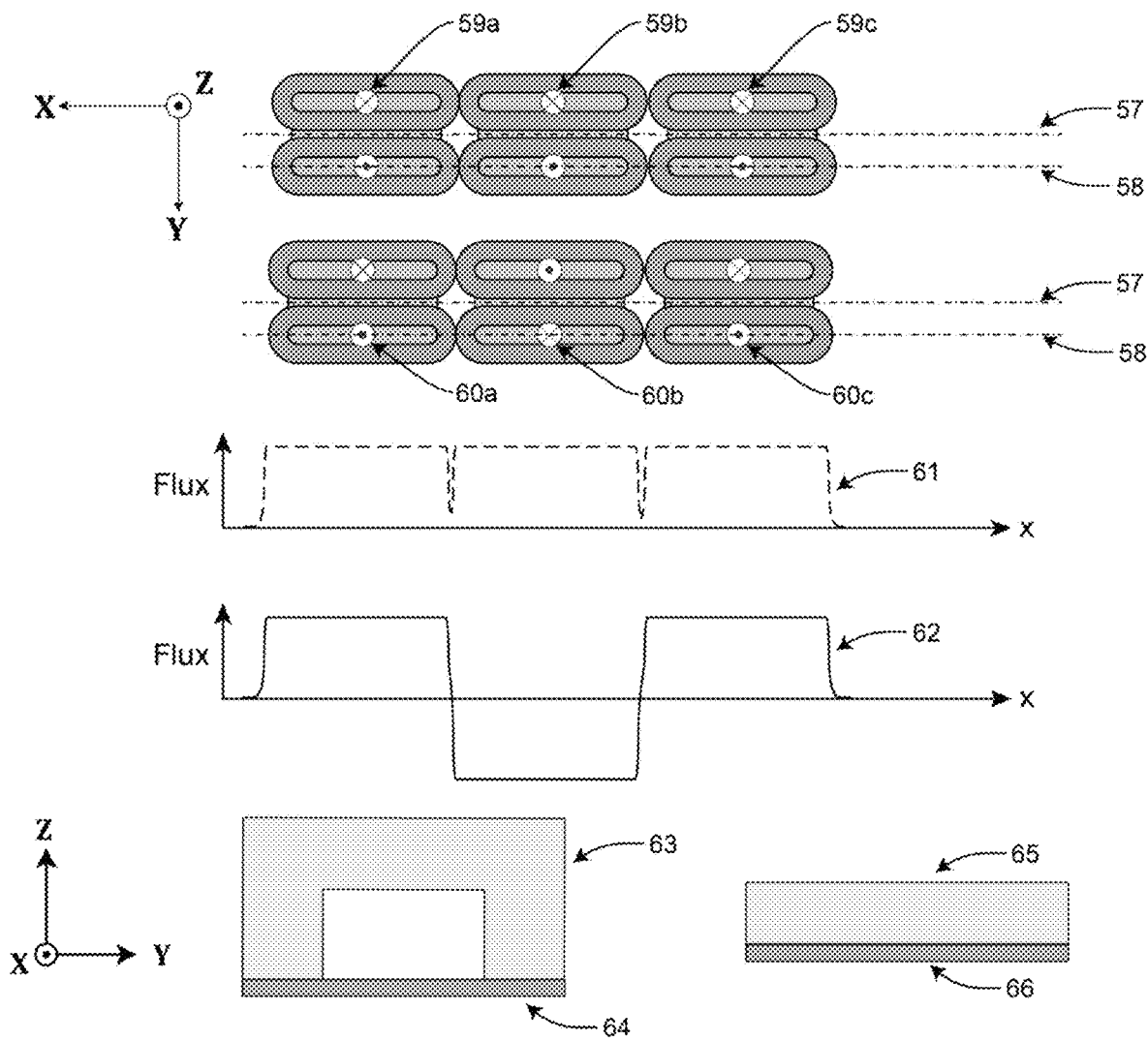
FIG. 10 shows exemplary embodiments of engines interacting with a guideway to produce a longitudinal braking force.

FIG. 10 shows an embodiment in which a system including a plurality of engines interacts with a single guideway to produce a longitudinal braking force. In the exemplary embodiment, a set of plural engines arranged to interact with a single guideway can be used to generate a controllable braking force. FIG. 10 shows the nominal driving configuration for a set of three engines arranged parallel to each other in the travel direction (X-direction) with net flux directions 59a, 59b, 59c. Evaluating the flux seen at the surface of the guideway along the line 58 corresponding to the location of a pole, a flux distribution in the X-direction is depicted by the curve 61, which is largely uniform with some variation due to longitudinal spacing between the engines.

If the central engine is driven so that the net flux direction is opposite to the engines on either side, whereby the net flux on each engine is 60a, 60b, 60c, then the flux evaluated on a line 58 along the surface of the guideway is depicted by the curve 62, where the flux in the center of the distribution is of equal magnitude but opposite sign to the flux generated by the other two engines. This sharp gradient allows the generation of large eddy currents in the guideway, which generate a drag or braking force opposite to the direction of motion (not shown).

While this illustration shows a full flux reversal, it is be understood that this arrangement is not intended to be limiting and that any amplitude difference between the engines will generate this braking force to some extent. Thus, this arrangement represents a controllable braking force.

While the guideway may be identical to that used above for generating vertical and lateral forces, it also contemplated to modify the guideway to include, in addition to the ferrous flux-guiding guideway 63 or 65 geometries described above, a largely non-ferrous but electrically conducting eddy current generation layer 64 or 66. It is understood that eddy current generation layers can be used with any design and geometry of the guideway without departing from the spirit and scope of the embodiments.

Figure 11:
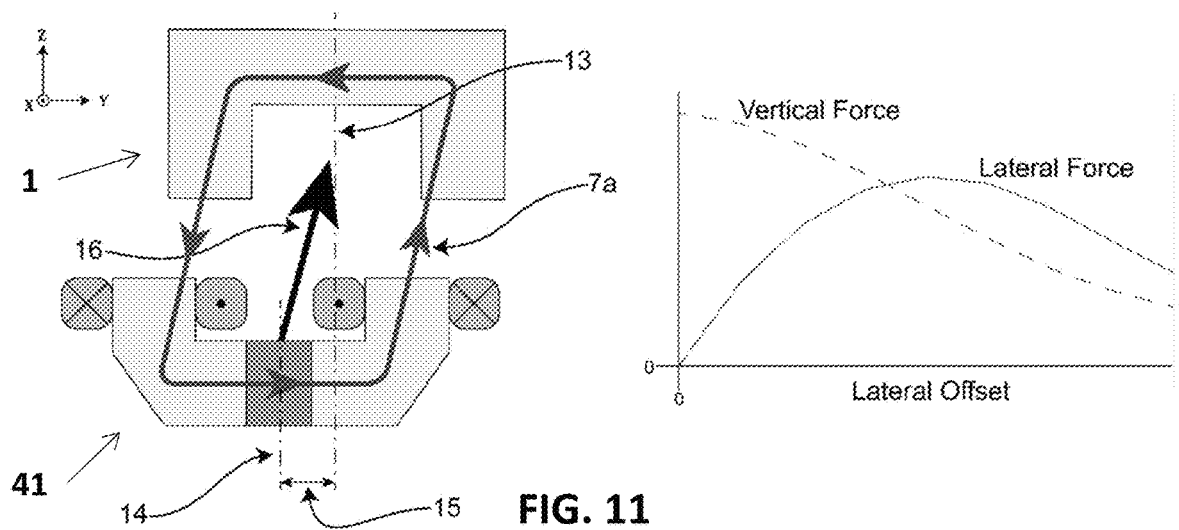
FIG. 11 shows a force vector with lateral offset between the engine and guideway.

Embodiments are directed to correcting for lateral offsets arising between the engine and the guideway. As shown in FIG. 11, a variation of vertical and lateral forces as a function of lateral offsets between the centerlines is illustrated. If the guideway 1 is built symmetrically around its centerline 13, and the engine 41 is built symmetrically around its centerline 14, it is preferred that centerlines 13, 14 are co-linear so that the gap-closing force is oriented largely vertically (Z-direction), with near zero or zero lateral force (Y-direction), see, e.g., FIG. 3 When the centerline 14 of engine 41 is laterally offset from centerline 13 of laterally by an offset 15 in the negative Y-direction, as in FIG. 11, a net force vector 16 acting on the engine is tilted such that a positive lateral force is produced.

This mechanism implies that the engine may be used to generate a passive restoring force in the lateral or guidance direction, obtaining lift and guidance from the same plane of interaction with the guideway. This mechanism may also be used to implement an active guidance scheme by deliberately creating offsets between a series of engines and a guideway.

Figure 12:
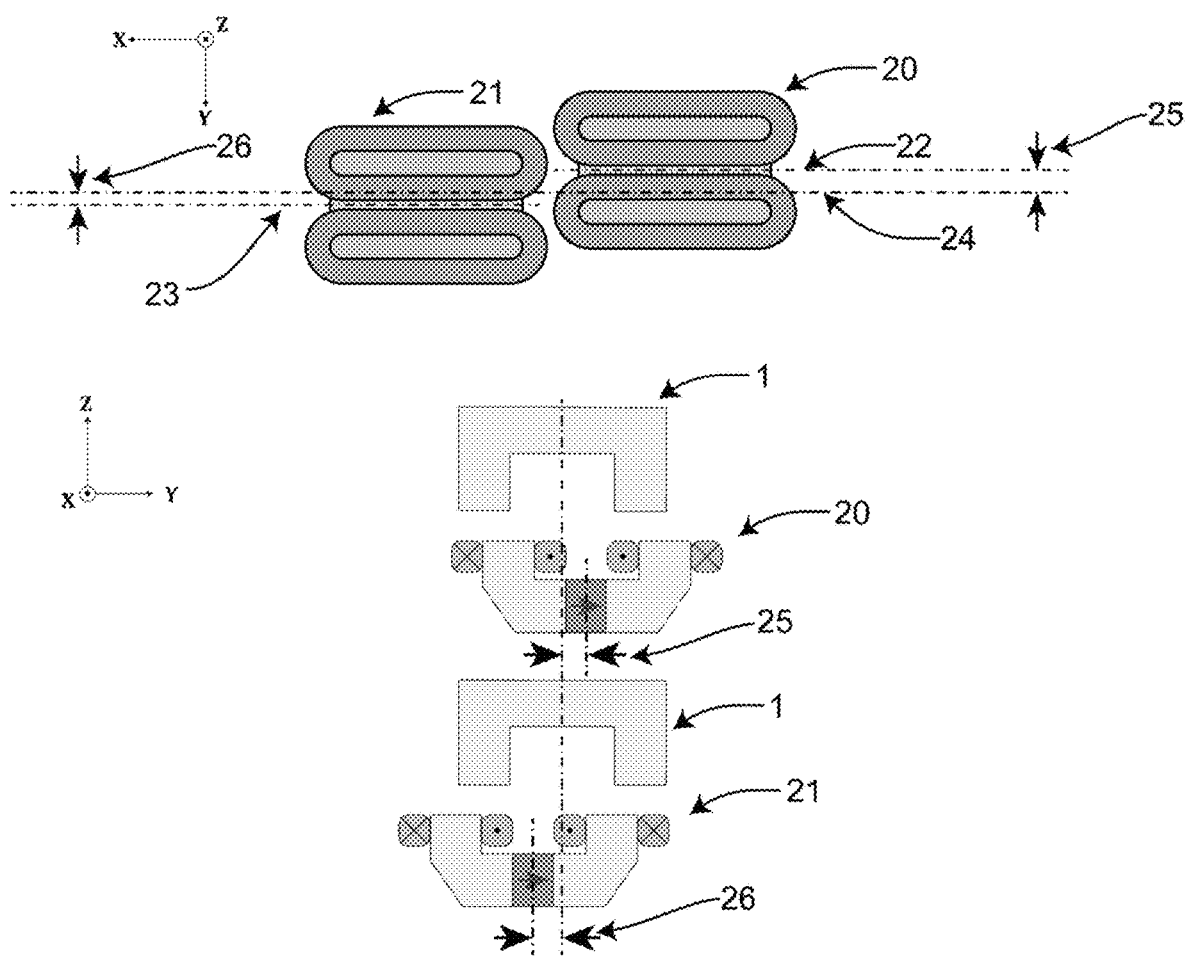
FIG. 12 shows an embodiment of engines laterally offset from a guideway centerline.

In embodiments, an active guidance configuration, in which the engines are laterally offset from a centerline of the guideway, is provided. As shown in FIG. 12, a pair of engines 20, 21, which are successively arranged in a travel direction and offset from a centerline 24 of a guideway, may be attached to a same mechanical structure (not illustrated) that can transmit forces between them. As illustrated, a centerline 22 of engine 20 may be offset from guideway centerline 24 by an offset 25 (in the negative Y-direction), while a centerline 23 of engine 21 may be offset from guideway centerline 24 by an offset 26 (in the positive Y-direction). From the previous discussion of lateral offsets between the engine and guideway, those skilled in the art will be able to determine that the flux in engine 20 will cause a positive vertical (Z-direction) force and a lateral force in the negative Y-direction. Simultaneously, the flux in engine 21 will cause a positive vertical (Z-direction) and a positive Y-direction lateral force.

The combination, when driven at equal offsets 25, 26 at equal air-gaps and equal currents will produce net-zero lateral force and net positive vertical force. When currents are driven such that the flux in engine 20 is strengthened and the flux in engine 21 is decreased, it is possible to generate the same vertical force and a net lateral force in the negative Y-direction. Similarly, when currents are driven such that the flux in engine 20 is decreased and the flux in engine 21 is strengthened, it is possible to generate the same vertical force and a net positive lateral force. In addition, if current is driven such that both flux in engine 20 and engine 21 is strengthened equally, it is possible to generate increased vertical force and net zero lateral force, or to increase vertical force and maintain the same lateral force. This shows that this configuration can generate independently controllable vertical and lateral forces, a key performance feature in active control systems and vehicle controls.

Figure 13:
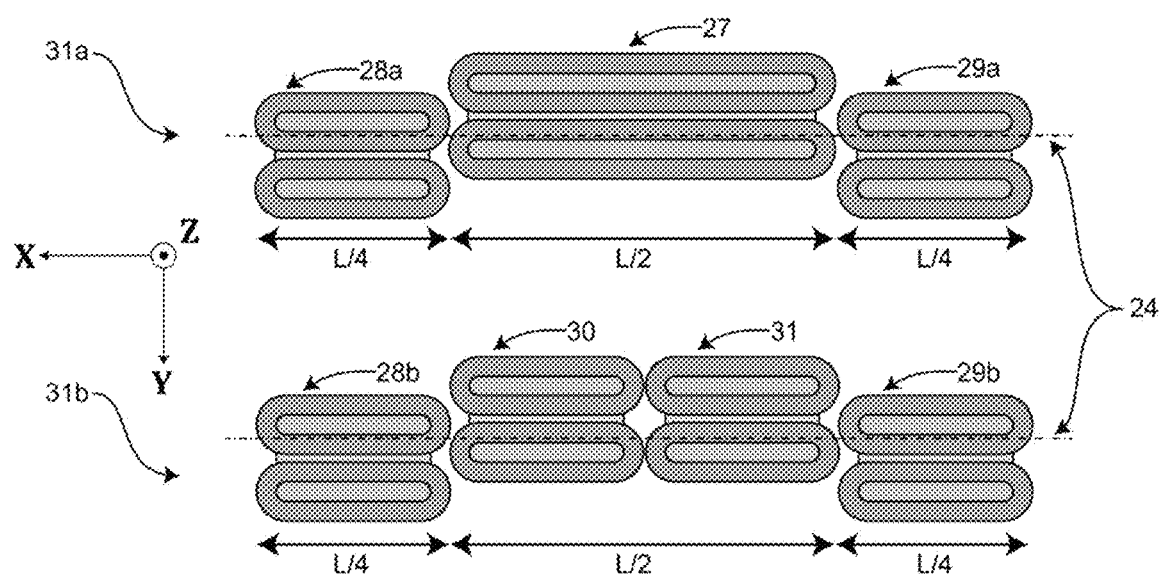
FIG. 13 shows embodiments for decoupled engine axes on a guideway.

With reference to FIG. 13, embodiments directed to configurations for an active guidance for decoupled axes on a single guideway are shown. A set of engines may be arranged so that they are attached to a same mechanical structure and interact with a single guideway, as shown in FIG. 13. In addition to independently controllable vertical and lateral forces, it has been found to be desirable to also control moments or at least not induce moments in other axes. Two single guideway topologies are depicted in FIG. 13, i.e., guideway topology 31*a*, which includes engines 27, 28*a*, 29*a* and guideway topology 31*b*, which includes engines 28*b*, 29*b*, 30, 31, which represent a minimum configuration for zero moments generated in rotations around the Z axis and controllable moments around the Y axis. Engines 30, 31, which have a combined X-dimension length of L/2 in guideway topology 31*b*, may be replaced with a single engine 27 with a length of L/2, as shown in guideway topology 31*a*, and generate a same force per unit length. Both configurations are shown with their representative Y-direction offsets relative to guideway centerline 24.

Figure 14:
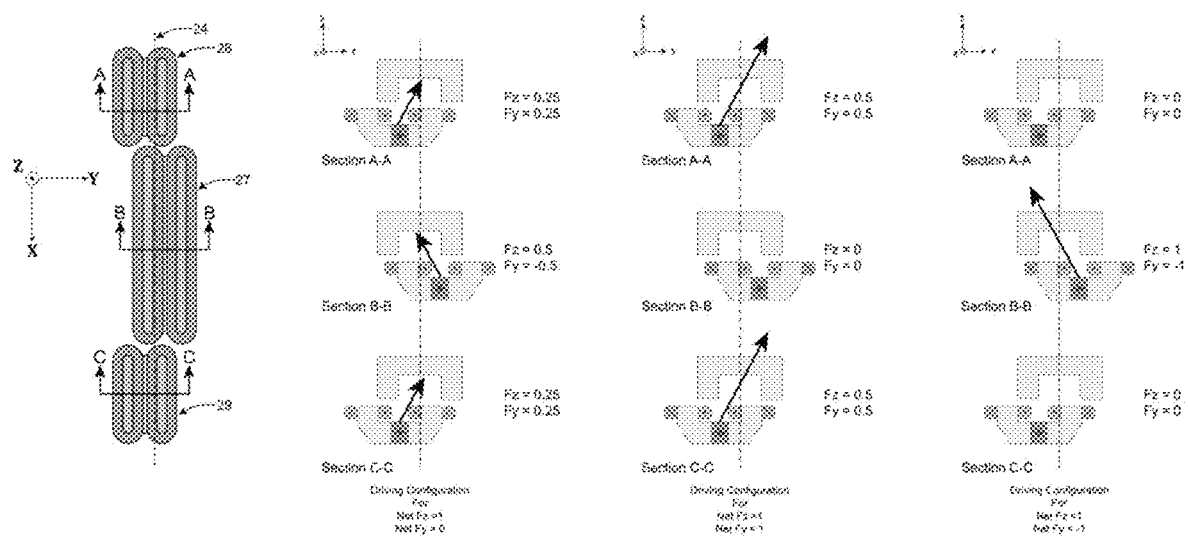
FIG. 14 shows an exemplary embodiment for active control on a guideway.

FIG. 14 illustrates a control methodology to generate independent vertical and lateral forces in accordance with embodiments. While this exemplary figure uses the example of topology 31 as depicted in FIG. 13, it is understood that this the control method applies equally to topology 31*b* depicted in FIG. 13, as well as any number of topologies utilizing additional engines repeated on a same mechanical structure.

In this embodiment, it is understood that engines 28, 29 are offset an equal amount in the negative Y-direction from centerline 24 of the guideway, and engine 27 is offset by an equal amount in the positive Y-direction from centerline 24 of the guideway. However, a similar control method may be generated for unequal lateral offsets, where only the local lateral offset must be known by a controller without departing from the spirit and scope of the embodiments.

In a first driving configuration, all three engines 28, 29, 27 driven with equal MMF per length. In this regard, as engine 27 is twice the length of engines 28, 29, the requirement is that the MMF generated per length in engine 27 is equal to the MMF per length equal to engines 28, 29 combined. The individual vertical force on each of engines 28, 29 is 0.25 (in dimensionless units) with an individual lateral force of 0.25. The individual vertical force on engine 27 is 0.5 (due to the fact that it is double the length of engines 28, 29 and the individual lateral force of −0.5. The net vertical force is thus 1, and the net lateral force is 0.

In a second driving configuration, the total flux on engine 27 is driven to zero, and thus the total force on engine 27 in vertical and lateral axes is zero, and the flux on each of engines 28, 29 is doubled. The individual vertical force on each of engines 28, 29 is 0.5, and the individual lateral force on each is 0.5. The net vertical force is thus 1, and the net lateral force is 1.

In the third driving configuration, engine 27 is driven such that its total flux doubles, and thus the total force on engine 27 in vertical and lateral axes is 1, and each of engines 28, 29 is driven such that the flux for each is zero, whereby their individual forces are zero. The net vertical force is thus 1, and the net lateral force is −1.

Of course, it is understood that these driving configurations are illustrative and not intended to be limiting in any manner, and it should be understood by those skilled in the art that a continuum of driving configurations exist between these cases.

Figure 15:
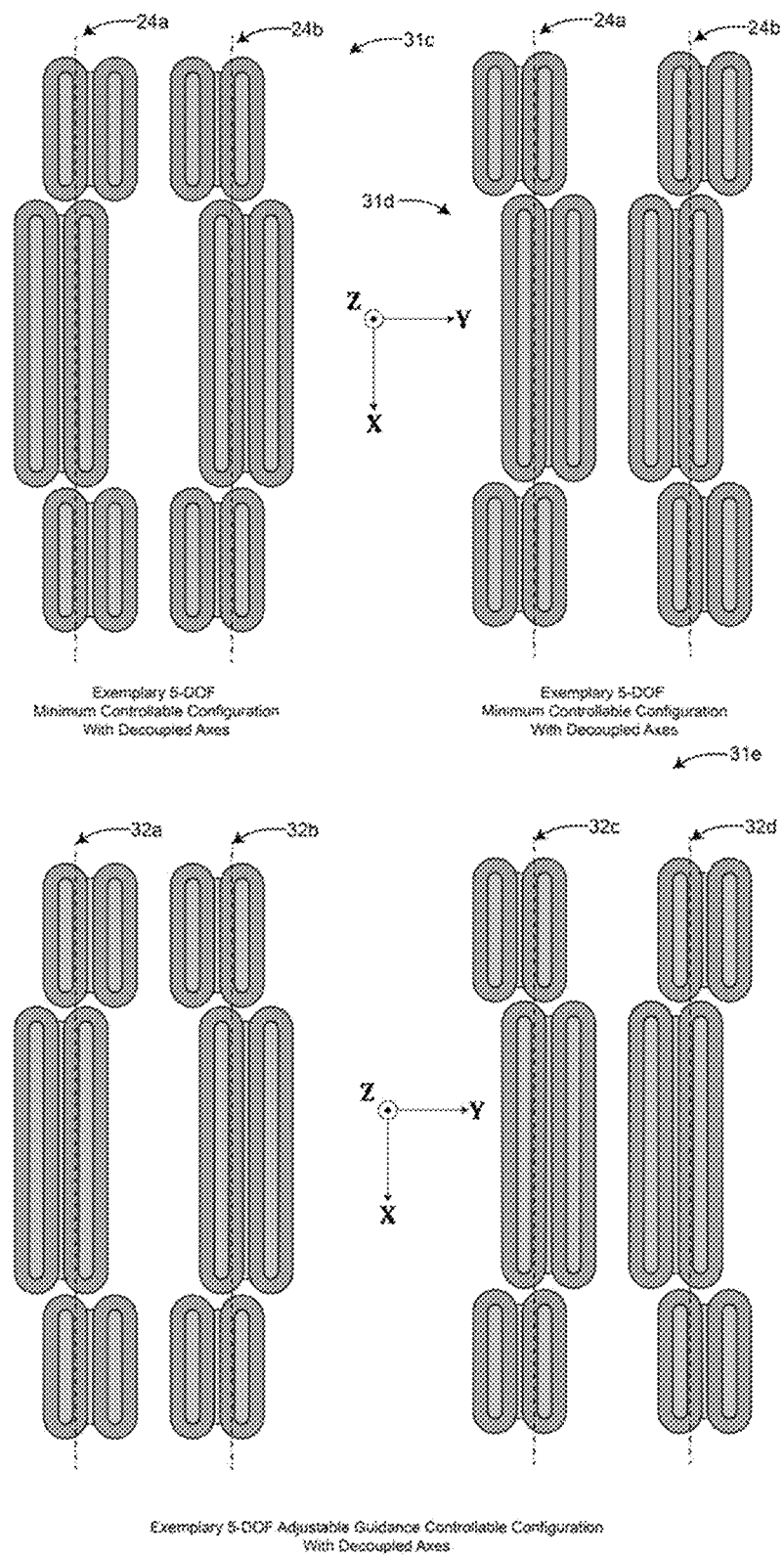
FIG. 15 shows embodiments for active guidance with decoupled axes.

The above-described embodiments for single guideway configurations topologies 31*a*, 31*b* have a coupled moment around X, but no ability to control rotations around Z. FIG. 15 shows exemplary minimum configurations utilizing two guideways for control of Y, Z, and rotations around X, Y, Z axes in topologies 31*c*, 31*d* interacting with guideways having centerlines 24*a*, 24*b*, respectively. Those skilled in the art can determine from the previous description of the single guideway topologies how the other axes may be controlled, and why this is the minimum configurations as illustrated.

Further, a four guideway configuration is shown in topology 31*e*, which is includes a combination of topologies 31*c*, 31*d* interacting with guideways having centerlines 32*a*, 32*b*, 32*c*, 32*d*. This configuration in particular allows the ability to decrease or zero out vertical and/or lateral forces on a set of guideways without losing control of the five axes, i.e., Y, Z and rotations around X, Y, Z.

Figure 16:
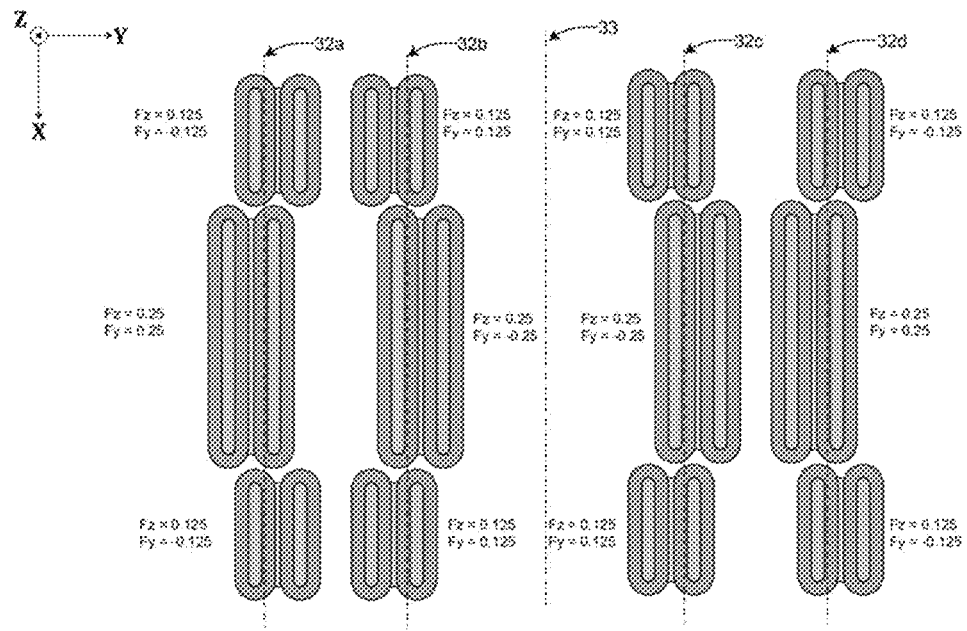
FIG. 16 shows embodiments for guidance control on multiple guideways with decoupled axes.
Figure 16:
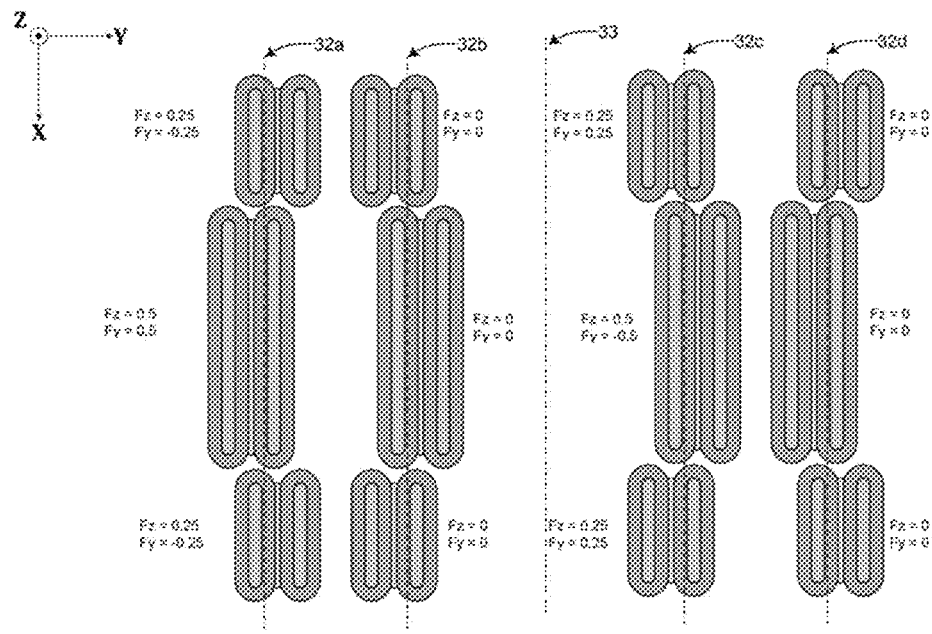

FIG. 16 illustrates two driving configurations exhibiting the ability to adjust the distribution of vertical and lateral forces between four guideways with centerlines 32*a*-32*d*. For the purpose of this description, it can be assumed that the center of gravity (CG) of the moving structure exists on centerline 33. However, it is understood that the embodiments are not limited to such a CG configuration.

In a first driving configuration, the lateral and vertical forces are distributed equally among the four guideways, with the individual forces distributed as shown in dimensionless units. The net lateral force shown is zero, but may be adjusted to have a net positive or net negative lateral force. The net moments on all axes is zero, but could be adjusted to have net moments on any of the three axes.

In a second driving configuration, the lateral and vertical forces are distributed between two guideways 32*a*, 32*c* with the forces on guideways 32*b*, 32*d* net zero. The total vertical force remains 1, and the total lateral force remains zero. The moments on all other axes remains zero.

In addition to these driving configurations, it is possible to distribute lateral forces equally among all guideways, and distribute guidance between two guideways. This enables the possibility of implementing a vehicle-side switching mechanism.

Figure 17:
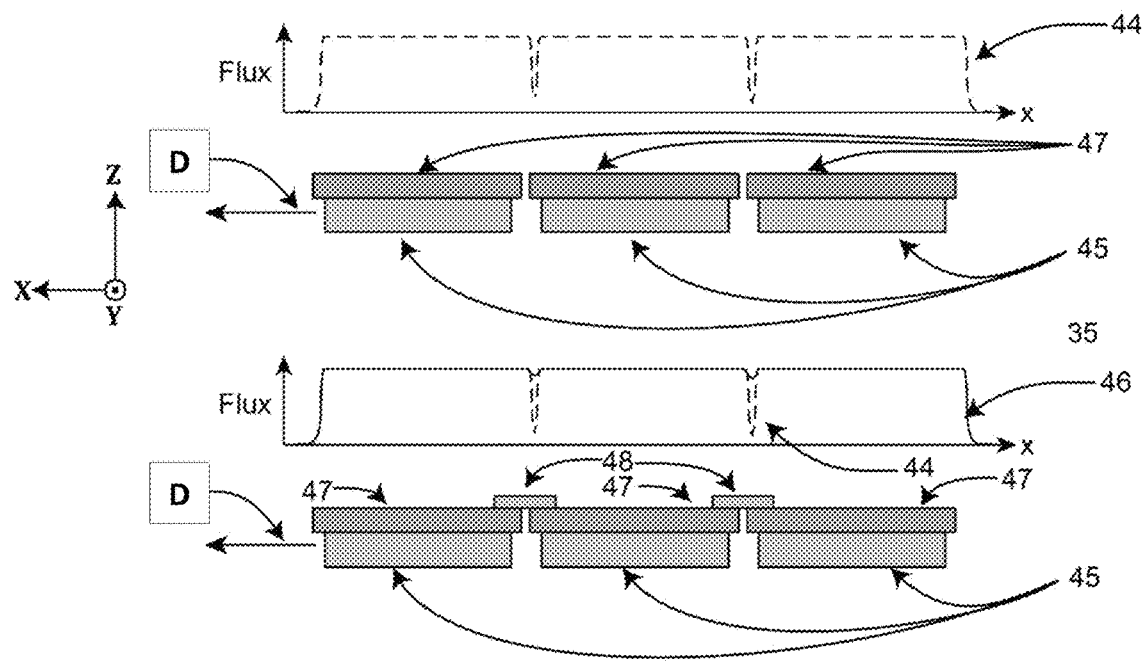
FIG. 17 shows embodiments with axial bridging elements to minimize flux change between engines.
Figure 18:
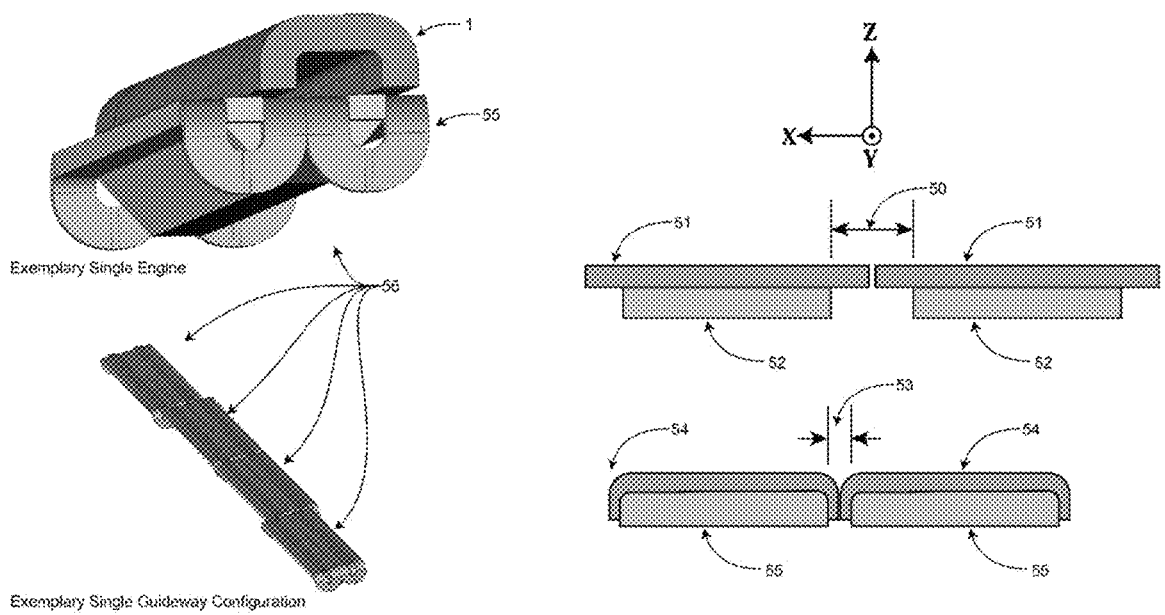
FIG. 18 shows exemplary coil arrangements to minimize distance between engines.

A preferable feature for low drag configurations of engines interacting with single or multiple guideways is to minimize the longitudinal or X-direction spacing between engines. This longitudinal spacing as shown in FIG. 17, with engines formed with electromagnets 47 and cores 45 of permanent magnets and poles, may generate significant variation in the flux distribution in the X-direction, as shown by distribution 44. This configuration generates drag due to the spatial gradient of the magnetic flux in the direction of travel D, as previously discussed. To mitigate this drop of flux, bridging elements 48 may be added to homogenize the flux distribution. If these bridging elements are made of either permanent magnets or ferrous materials, or some combination thereof, it is possible to decrease the variation in flux, e.g., as shown by distribution 46, which represents a significant reduction in drag force. Another contemplated procedure for decreasing the flux variation between engines in the direction of travel is to decrease the longitudinal gap 50 between engines by adjusting the geometry of the electromagnets. If the original electromagnets are essentially racetrack shaped coils 51 slotted onto cores 52 of poles and permanent magnetics, a minimum distance between engines is determined by the end turn of the coils (i.e., the X-direction extent of the coils that extend past cores 52) plus some margin. If the coil end turns 54 are bent and slotted onto cores 55 of poles and permanent magnets, a minimum X-direction spacing 53 results between engines, which is substantially reduced relative to distance 50. This reduction of distance also reduces the variation of magnetic flux in the X-direction, and if the direction of travel is largely parallel to the X-axis along the guideway then drag may also be reduced.

An embodiment considers a high-speed transportation system that includes a substantially enclosed structure, a vehicle, a propulsion system, and a levitation system. The enclosed structure may include any of several known structures, such as a tube. The propulsion system may include any of several known systems, including a linear motor. The levitation system may include an engine and a guideway. The engine and guideway act as prior described to maintain the ride height of the vehicle while the vehicle is propelled by the linear motor.

It is understood that the embodiments are limited to any specific arrangements of structures described in the application, such that other arrangements of the structures are contemplated without departing from the spirit and scope of the disclosed embodiments, e.g., in embodiments, the engine can be substantially fixed to a ground, such as a tube in a high-speed transportation system, and the guideway is attached to a vehicle.

Some embodiments are directed to an engine propulsion system. The engine propulsion system includes a plurality of engines aligned in the longitudinal or travel direction. A first engine is configured to create an attractive force between the first engine and a conductor located substantially on the guideway, as previously described. The conductor may be substantially displaced from the engine along the direction of travel, such that the engine may pull in substantially the direction of travel. This has the effect of creating a travelling electromagnetic wave within the engine that interacts with the conductor on the guideway. A similar effect can be achieved with a repulsive force between the engine and the conductor, such that the engine will push off of the conductor in substantially the direction of travel.

System Environment

Aspects of embodiments of the present disclosure (e.g., control systems for the augmented permanent magnet system) can be implemented by such special purpose hardware-based systems that perform the specified functions or acts, or combinations of special purpose hardware and computer instructions and/or software, as described above. The control systems may be implemented and executed from either a server, in a client server relationship, or they may run on a user workstation with operative information conveyed to the user workstation. In an embodiment, the software elements include firmware, resident software, microcode, etc.

As will be appreciated by one skilled in the art, aspects of the present disclosure may be embodied as a system, a method or a computer program product. Accordingly, aspects of embodiments of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure (e.g., control systems) may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, a magnetic storage device, a USB key, and/or a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present disclosure may be embodied in a field programmable gate array (FPGA).

Figure 19:
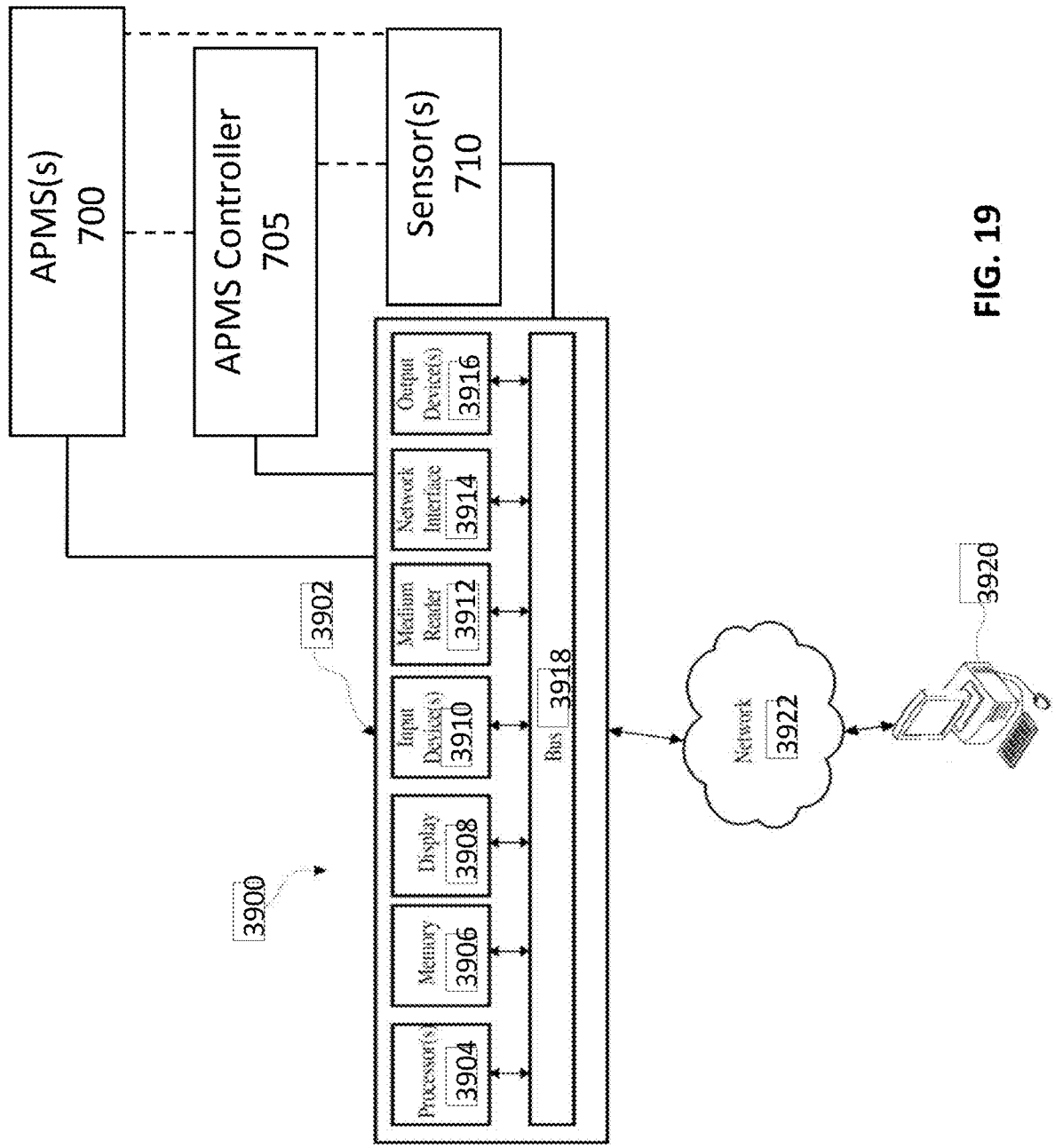
FIG. 19 shows an exemplary environment for practicing aspects of the present disclosure.

FIG. 19 is an exemplary system for use in accordance with the embodiments described herein. The system 3900 is generally shown and may include a computer system 3902, which is generally indicated. The computer system 3902 may operate as a standalone device or may be connected to other systems or peripheral devices. For example, the computer system 3902 may include, or be included within, any one or more computers, servers, systems, communication networks or cloud environment.

The computer system 3902 may operate in the capacity of a server in a network environment, or in the capacity of a client user computer in the network environment. The computer system 3902, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 3902 is illustrated, additional embodiments may include any collection of systems or sub-systems that individually or jointly execute instructions or perform functions.

As illustrated in FIG. 19, the computer system 3902 may include at least one processor 3904, such as, for example, a central processing unit, a graphics processing unit, or both. The computer system 3902 may also include a computer memory 3906. The computer memory 3906 may include a static memory, a dynamic memory, or both. The computer memory 3906 may additionally or alternatively include a hard disk, random access memory, a cache, or any combination thereof. Of course, those skilled in the art appreciate that the computer memory 3906 may comprise any combination of known memories or a single storage.

As shown in FIG. 19, the computer system 3902 may include a computer display 3908, such as a liquid crystal display, an organic light emitting diode, a flat panel display, a solid state display, a cathode ray tube, a plasma display, or any other known display. The computer system 3902 may include at least one computer input device 3910, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 3902 may include multiple input devices 3910. Moreover, those skilled in the art further appreciate that the above-listed, exemplary input devices 3910 are not meant to be exhaustive and that the computer system 3902 may include any additional, or alternative, input devices 3910.

The computer system 3902 may also include a medium reader 3912 and a network interface 3914. Furthermore, the computer system 3902 may include any additional devices, components, parts, peripherals, hardware, software or any combination thereof which are commonly known and understood as being included with or within a computer system, such as, but not limited to, an output device 3916. The output device 3916 may be, but is not limited to, a speaker, an audio out, a video out, a remote control output, or any combination thereof. As shown in FIG. 19, the computer system 3902 may include communication and/or power connections to one or more augmented permanent magnet systems (APMS) 700, and an APMS controller 705 to control activation/deactivation of the respective APMS 700, in accordance with aspects of the disclosure. Additionally, as shown in FIG. 19, the computer system 3902 may include one or more sensors 710 (e.g., positional sensors, distance/displacement sensors, velocity sensors, accelerometers, GPS systems, magnetic sensors) that may provide data (e.g., positional data, ride height data) to the APMS controller 705.

Furthermore, the aspects of the disclosure may take the form of a computer program product accessible from a computer-usable or computer-readable medium providing program code for use by or in connection with a computer or any instruction execution system. The software and/or computer program product can be implemented in the environment of FIG. 19. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 20:
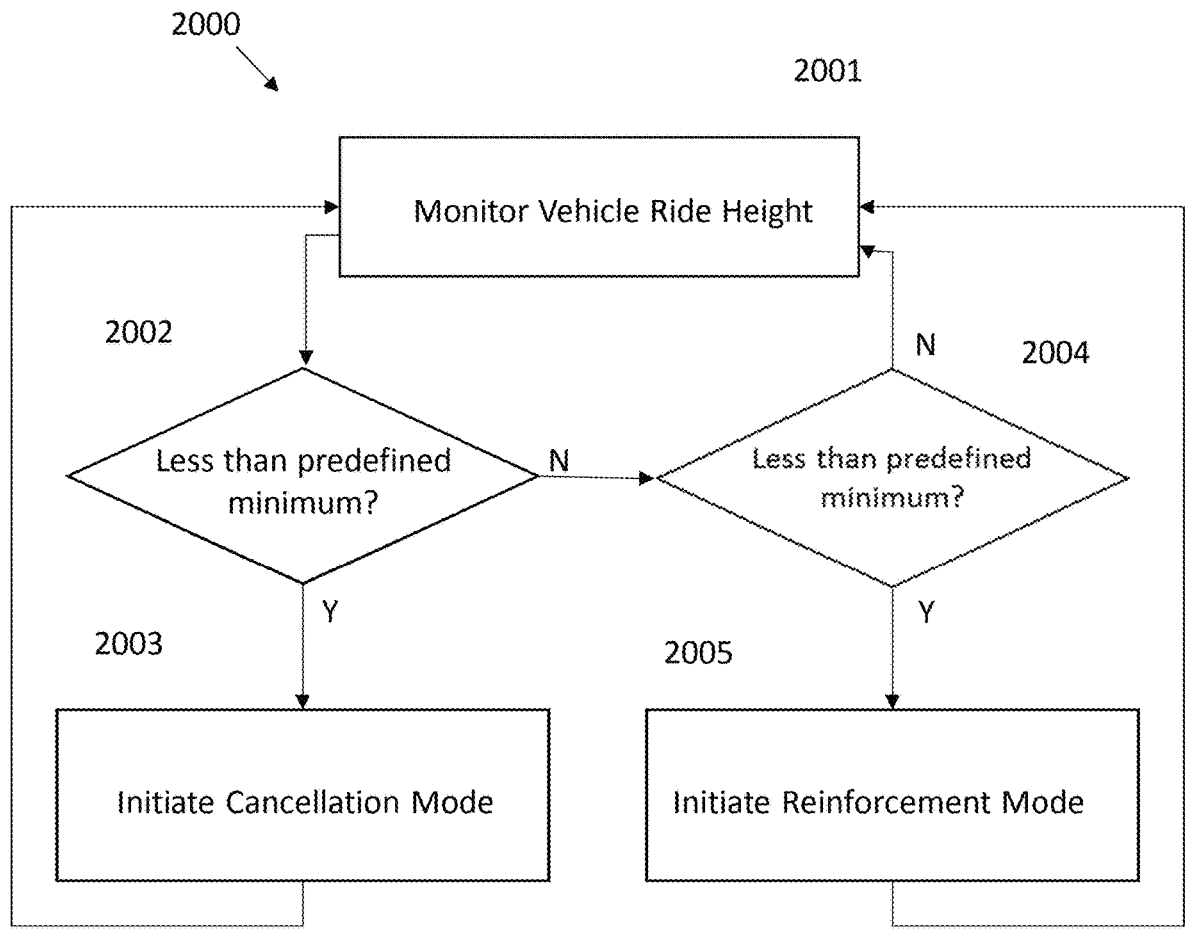
FIG. 20 shows an exemplary method for controlling the magnetic bearing according to embodiments.

FIG. 20 illustrates an exemplary process 2000 for controlling the ride height of the vehicle. At 2001, the ride height of the vehicle is monitored, measured or sensed. In this regard, it is understood that this ride height parameter can be determined by measuring an air gap distance between the engine and guideway, or measuring a distance between a reference surface on the vehicle and a reference surface or point on the guideway or other fixed position, or measuring engine/guideway spacing. At 2002, a determination is made whether the ride height distance is less than a predetermined minimum. If the monitored ride height is less than the predetermined minimum, the cancellation mode is initiated at 2003. As discussed above, in the cancellation mode, current is driven through the coils of the engine in a direction to generate a flux opposite the direction of the natural flux/zero current state of the engine. After the cancellation mode begins, the process returns to 2001 to monitor the ride height to confirm the corrective action has been successfully performed.

If the monitored ride height is not less than the predetermined minimum, a determination is made, at 2004 whether the ride height distance is greater than a predetermined maximum. If the ride height is greater than the predetermined maximum, the reinforcement mode is initiated at 2005. As discussed above, in the reinforcement mode, current is driven through the coils of the engine in a direction to generate a flux in a same direction as the natural flux/zero current state of the engine. After the reinforcement mode begins, the process returns to 2001 to monitor the ride height to confirm the corrective action has been successfully performed. If the ride height is not greater than the predetermined maximum, the process returns to 2001 to continue monitoring ride height.

It is to be understood that the above-described process is merely exemplary and should not be construed as limiting the process to performance in any particular order.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the disclosure are not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

While the specification describes particular embodiments of the present disclosure, those of ordinary skill can devise variations of the present disclosure without departing from the inventive concept.

One or more embodiments of the disclosure may be referred to herein, individually and/or collectively, by the term "invention" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

While the specification describes particular embodiments of the present disclosure, those of ordinary skill can devise variations of the present disclosure without departing from the inventive concept.

Insofar as the description above and the accompanying drawing disclose any additional subject matter that is not within the scope of the claims below, the embodiments are not dedicated to the public and the right to file one or more applications to claim such additional embodiments is reserved.

What is claimed is:

1. A magnetic bearing system for controlling magnetic coupling between a mobile carriage and a guideway, the magnetic bearing system comprising:
   at least two engines successively arranged in a travel direction, wherein each of the at least two engines comprises at least two poles,
   wherein the at least two engines have centerlines in the travel direction that are fixedly offset from each other,
   wherein the at least two engines are configured to be magnetically coupled to the guideway through air gaps.

2. The magnetic bearing system according to claim 1, wherein each of the at least two engines further comprises at least one permanent magnet and at least one coil.

3. The magnetic bearing system according to claim 2, wherein the at least one coil comprises at least two coils arranged so that in each of the at least two engines at least one of the at least two coils surrounds each of the at least two poles.

4. The magnetic bearing system according to claim 1, wherein the at least two poles of each of the at least two engines have free ends facing the guideway.

5. The magnetic bearing system according to claim 4, wherein the air gaps are located between the free ends of the at least two poles of each of the at least two engines and the guideway.

6. The magnetic bearing system according to claim 4, wherein each of the at least two engines further comprises a lateral portion joining the at least two poles together at ends opposite the free ends, and at least one permanent magnet is arranged in the lateral portion.

7. The magnetic bearing system according to claim 6, wherein the lateral portion of each of the at least two engines is oriented perpendicularly to the travel direction.

8. The magnetic bearing system according to claim 1, wherein each of the at least two engines further comprises at least one permanent magnet to generate a magnetic flux through the guideway and the air gaps.

9. The magnetic bearing system according to claim 8, wherein the magnetic flux generated by the at least one permanent magnet of each of the at least two engines is sufficient to maintain a predetermined spacing for the air gaps while holding the vehicle against a force of gravity.

10. The magnetic bearing system according to claim 1, wherein each of the at least two poles of the at least two engines are laterally offset from each other in a direction perpendicular to the travel direction.

11. The magnetic bearing system according to claim 10, wherein the at least two engines comprise at least a first engine and a second engine, and the at least two poles of the first engine have a same length in the travel direction as the at least two poles of the second engine.

12. The magnetic bearing system according to claim 10, the at least two engines comprise at least a first engine and a second engine, and the at least two poles of the first engine have a different length in the travel direction than the at least two poles of the second engine.

13. The magnetic bearing system according to claim 12, wherein the at least two poles of the first engine have a length in the travel direction that is a multiple of a length of the at least two poles of the second engine in the travel direction.

14. The magnetic bearing system according to claim 1, wherein the at least two engines comprise at least three engines that include at least a first engine, a second engine and a third engine successively arranged in the travel direction, the second engine being located between the first engine and the third engine, wherein the centerlines of the first engine and the third engine are aligned in the travel direction and the centerline of the second engine is fixedly offset from the centerlines of the first engine and the third engine in a direction perpendicular to the travel direction.

15. The magnetic bearing system according to claim 14, wherein lengths of the at least two poles of the first engine and lengths of the at least two poles of the third engine are the same, and lengths of the at least two poles of the second engine are different from the lengths of the at least two poles of each of the first engine and the third engine.

16. The magnetic bearing system according to claim 15, wherein the lengths of the at least two poles of the second engine are equal to combined lengths of the at least two poles of the first engine and of the third engine.

17. The magnetic bearing system according to claim 1, wherein the at least two engines comprise at least four engines that include at least a first engine, a second engine, a third engine and a fourth engine successively arranged in the travel direction, the second and third engines being located between the first engine and the fourth engine, wherein the centerlines of the first engine and the fourth engine are aligned in the travel direction and the centerlines of the second engine and the third engine are aligned in the travel direction, and the centerlines of the first engine and the fourth engine are fixedly offset from the centerlines of the second engine and the third engine in a direction perpendicular to the travel direction.

18. The magnetic bearing system according to claim 17, wherein lengths of the at least two poles of the first engine, second engine, third engine and fourth engine are a same length.

* * * * *